United States Patent
de la Fuente et al.

(10) Patent No.: US 10,430,924 B2
(45) Date of Patent: Oct. 1, 2019

(54) RESIZABLE, OPEN EDITABLE THUMBNAILS IN A COMPUTING DEVICE

(71) Applicant: QuirkLogic, Inc., Calgary (CA)

(72) Inventors: Alfonso Fabian de la Fuente, Victoria (CA); Michael Howatt Mabey, Calgary (CA); Nashirali Samanani, Calgary (CA)

(73) Assignee: QuirkLogic, Inc., Calgary (CA)

( * ) Notice: Subject to any disclaimer, the term of this patent is extended or adjusted under 35 U.S.C. 154(b) by 134 days.

(21) Appl. No.: 15/639,671

(22) Filed: Jun. 30, 2017

(65) Prior Publication Data

US 2019/0005616 A1    Jan. 3, 2019

(51) Int. Cl.
| | |
|---|---|
| H04N 5/45 | (2011.01) |
| G06T 3/40 | (2006.01) |
| G06T 11/80 | (2006.01) |
| G06T 3/00 | (2006.01) |
| G06F 16/11 | (2019.01) |
| G06F 17/24 | (2006.01) |
| G06T 11/60 | (2006.01) |

(52) U.S. Cl.
CPC ............ *G06T 3/403* (2013.01); *G06F 16/128* (2019.01); *G06F 17/241* (2013.01); *G06F 17/242* (2013.01); *G06T 3/0012* (2013.01); *G06T 11/60* (2013.01); *G06T 11/80* (2013.01)

(58) Field of Classification Search
None
See application file for complete search history.

(56) References Cited

U.S. PATENT DOCUMENTS

| | | | | |
|---|---|---|---|---|
| 6,476,834 B1* | 11/2002 | Doval | ............... | G06F 9/451 715/863 |
| 6,687,876 B1* | 2/2004 | Schilit | ............... | G06F 17/241 715/231 |
| 8,132,116 B1* | 3/2012 | Schendel | ............... | G06F 3/04817 715/764 |
| 8,418,084 B1* | 4/2013 | Tischer | ............... | G06F 3/0484 715/831 |
| 8,824,779 B1* | 9/2014 | Smyth | ............... | G06K 9/0061 382/100 |
| 8,826,147 B2* | 9/2014 | Sitrick | ............... | G06F 17/241 715/738 |
| 9,176,661 B2* | 11/2015 | Park | ............... | G06F 3/0488 |
| 9,176,826 B1* | 11/2015 | Smith | ............... | G06F 9/4411 |
| 9,811,514 B1* | 11/2017 | Lewis | ............... | G06F 17/241 |
| 9,990,118 B1* | 6/2018 | Dennis | ............... | G06F 3/04842 |
| 10,049,493 B1* | 8/2018 | Verizzo | ............... | G06F 3/011 |
| 10,055,888 B2* | 8/2018 | Christen | ............... | G06T 19/006 |

(Continued)

*Primary Examiner* — Martin Mushambo
(74) *Attorney, Agent, or Firm* — Chamberlain, Hrdlicka, White, Williams & Aughtry

(57) ABSTRACT

In general, embodiments of the invention relate to generating thumbnails representing files stored in database or other repository. More specifically, embodiments of the invention are directed to creating snapshots of file content and using the snapshots to generate a thumbnail representation for each file. In addition, embodiments of the invention are directed to resizing thumbnails having thumbnail content from file snapshots, annotating on the thumbnails using an interactive device, and later synchronizing the annotations with the file content.

22 Claims, 27 Drawing Sheets

(56) References Cited

U.S. PATENT DOCUMENTS

| | | | | |
|---|---|---|---|---|
| 2002/0157880 | A1* | 10/2002 | Atwood | G06F 3/033 178/20.02 |
| 2002/0186257 | A1* | 12/2002 | Cadiz | G06F 17/30867 715/838 |
| 2003/0164862 | A1* | 9/2003 | Cadiz | G06Q 10/107 715/838 |
| 2004/0100510 | A1* | 5/2004 | Milic-Frayling | G06F 17/30905 715/864 |
| 2005/0246647 | A1* | 11/2005 | Beam | G06F 3/0481 715/747 |
| 2006/0195486 | A1* | 8/2006 | Ohno | G11B 27/034 |
| 2006/0209089 | A1* | 9/2006 | Date | G06F 17/30265 345/632 |
| 2006/0224993 | A1* | 10/2006 | Wong | G06F 17/30274 715/800 |
| 2007/0139443 | A1* | 6/2007 | Marks | G06F 3/017 345/629 |
| 2008/0129728 | A1* | 6/2008 | Satoshi | G06T 3/0012 345/419 |
| 2008/0165141 | A1* | 7/2008 | Christie | G06F 3/044 345/173 |
| 2009/0019398 | A1* | 1/2009 | Hansson | G06F 17/30265 715/838 |
| 2009/0070781 | A1* | 3/2009 | Fitzgerald | G06F 3/04817 719/316 |
| 2011/0069357 | A1* | 3/2011 | Austin | H04N 1/00355 358/474 |
| 2011/0074824 | A1* | 3/2011 | Srinivasan | G06F 3/04883 345/660 |
| 2011/0163971 | A1* | 7/2011 | Wagner | G06F 3/04817 345/173 |
| 2012/0188247 | A1* | 7/2012 | Cheung | G06Q 30/0277 345/428 |
| 2012/0218303 | A1* | 8/2012 | Nakada | G02B 27/017 345/649 |
| 2012/0233565 | A1* | 9/2012 | Grant | G06F 3/04817 715/776 |
| 2013/0063495 | A1* | 3/2013 | Milan | G06T 3/0012 345/666 |
| 2013/0080884 | A1* | 3/2013 | Lisse | G06F 3/0483 715/255 |
| 2013/0154946 | A1* | 6/2013 | Sakuramata | G06F 3/0227 345/172 |
| 2013/0268877 | A1* | 10/2013 | Han | G06F 3/04842 715/769 |
| 2013/0311885 | A1* | 11/2013 | Wang | G06F 3/04845 715/719 |
| 2013/0321340 | A1* | 12/2013 | Seo | G06F 1/1641 345/174 |
| 2014/0009413 | A1* | 1/2014 | Su | G06F 3/0414 345/173 |
| 2014/0062939 | A1* | 3/2014 | Zehner | G06F 3/044 345/174 |
| 2014/0075332 | A1* | 3/2014 | Jeon | H04M 1/72552 715/752 |
| 2014/0139700 | A1* | 5/2014 | Sato | H04N 5/23222 348/222.1 |
| 2014/0157303 | A1* | 6/2014 | Jo | H04N 21/4126 725/32 |
| 2014/0195963 | A1* | 7/2014 | Cheung | G06F 17/50 715/781 |
| 2014/0292814 | A1* | 10/2014 | Tsujimoto | G06T 11/60 345/636 |
| 2014/0325362 | A1* | 10/2014 | Potts | G06F 17/30058 715/732 |
| 2015/0022551 | A1* | 1/2015 | Kim | G06T 19/006 345/633 |
| 2015/0035727 | A1* | 2/2015 | Kobayashi | G09G 3/003 345/8 |
| 2015/0100874 | A1* | 4/2015 | Pallakoff | G06F 17/241 715/232 |
| 2015/0116788 | A1* | 4/2015 | Oshinna | H04N 1/19594 358/451 |
| 2015/0127674 | A1* | 5/2015 | Ito | G06F 17/30386 707/758 |
| 2015/0169166 | A1* | 6/2015 | Kim | G06F 3/0488 715/838 |
| 2015/0264312 | A1* | 9/2015 | Chastney | H04N 7/148 715/719 |
| 2016/0034153 | A1* | 2/2016 | Lejeune | G06F 3/04847 715/765 |
| 2016/0034430 | A1* | 2/2016 | Beavers | G06F 3/0483 715/205 |
| 2016/0041700 | A1* | 2/2016 | Beavers | G06F 3/0483 715/838 |
| 2016/0041960 | A1* | 2/2016 | Lim | G06F 17/241 715/230 |
| 2016/0048275 | A1* | 2/2016 | Beavers | G06F 3/0483 715/202 |
| 2016/0054793 | A1* | 2/2016 | Kasahara | G06F 3/0488 345/633 |
| 2016/0055675 | A1* | 2/2016 | Kasahara | G06T 19/006 345/633 |
| 2016/0055676 | A1* | 2/2016 | Kasahara | G06T 19/006 345/633 |
| 2016/0065887 | A1* | 3/2016 | Ishizu | G09G 5/003 348/231.6 |
| 2016/0072889 | A1* | 3/2016 | Jung | H04L 67/1097 709/219 |
| 2016/0116979 | A1* | 4/2016 | Border | G06F 3/013 345/156 |
| 2016/0125162 | A1* | 5/2016 | Takata | G06F 19/321 705/2 |
| 2016/0210788 | A1* | 7/2016 | Kasahara | G06T 11/00 |
| 2016/0240125 | A1* | 8/2016 | Sridharan | G09G 5/02 |
| 2016/0261929 | A1* | 9/2016 | Lee | G06K 9/00724 |
| 2016/0291735 | A1* | 10/2016 | Nakanishi | G06F 3/044 |
| 2016/0291736 | A1* | 10/2016 | Tamaki | G06F 3/044 |
| 2016/0378294 | A1* | 12/2016 | Wright | G06F 3/04815 715/851 |
| 2017/0123982 | A1* | 5/2017 | Haven | G06F 17/3028 |
| 2017/0277670 | A1* | 9/2017 | Smith | G06F 17/241 |
| 2017/0286888 | A1* | 10/2017 | Merg | G06Q 10/06311 |
| 2017/0293905 | A1* | 10/2017 | Washington | G06F 3/04817 |
| 2017/0329748 | A1* | 11/2017 | Li | G06F 3/017 |

* cited by examiner

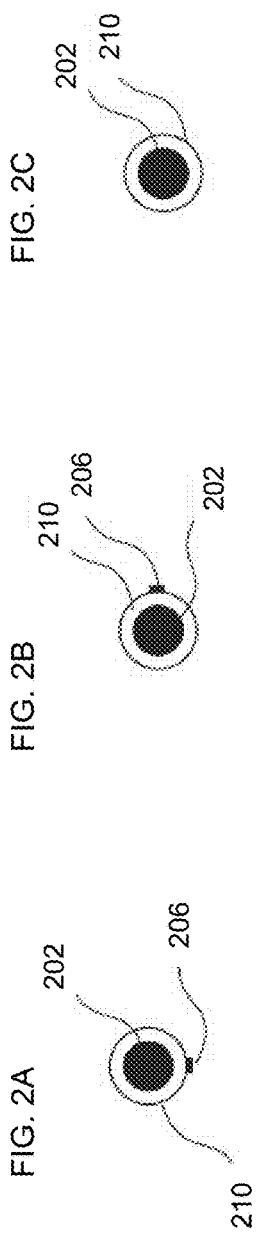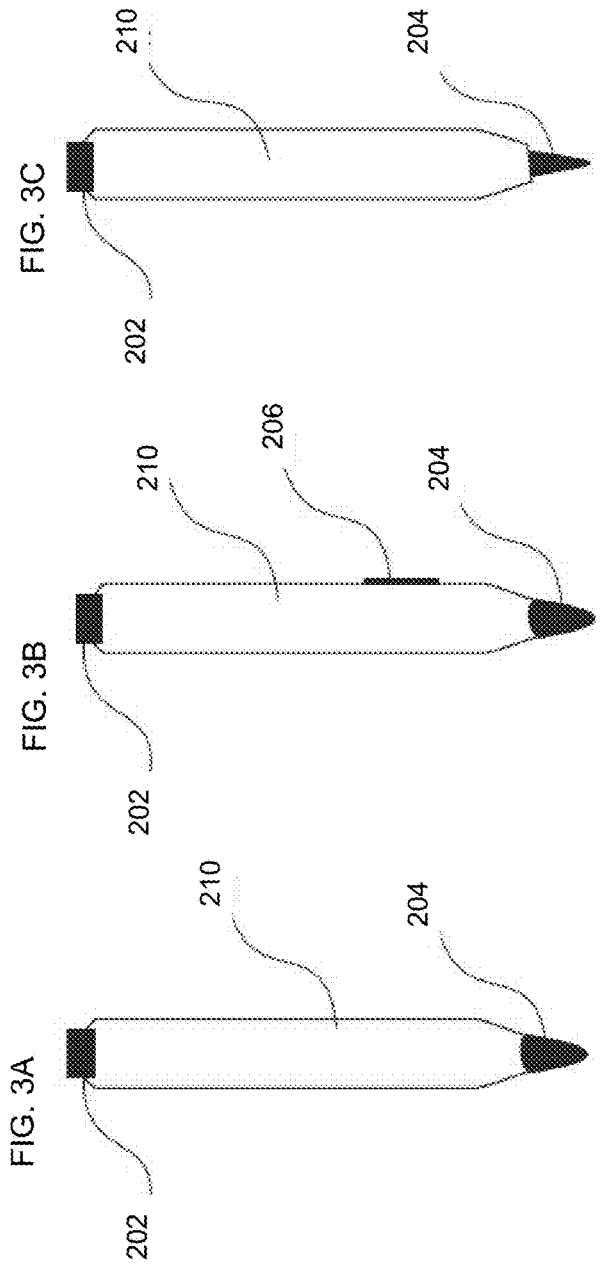

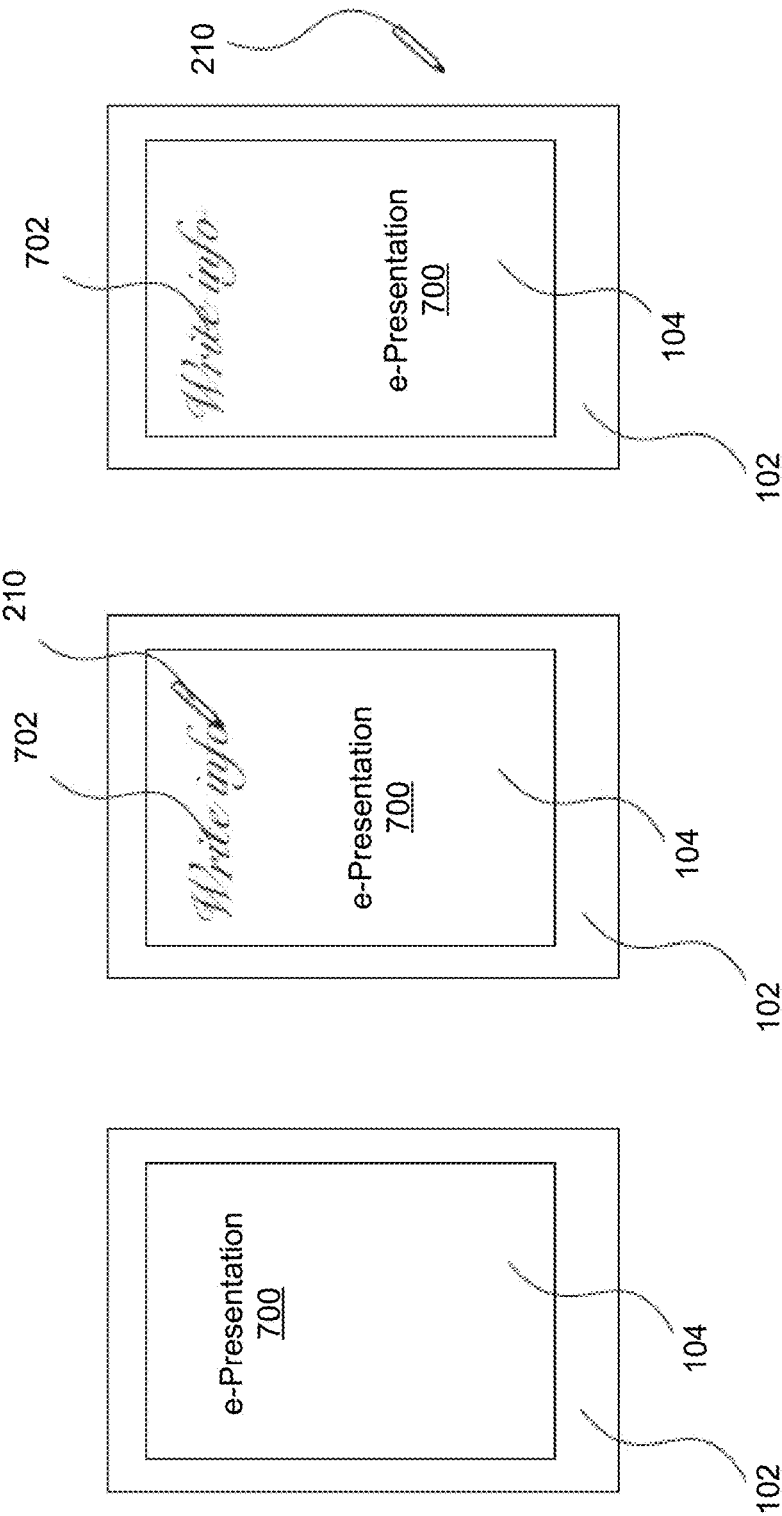

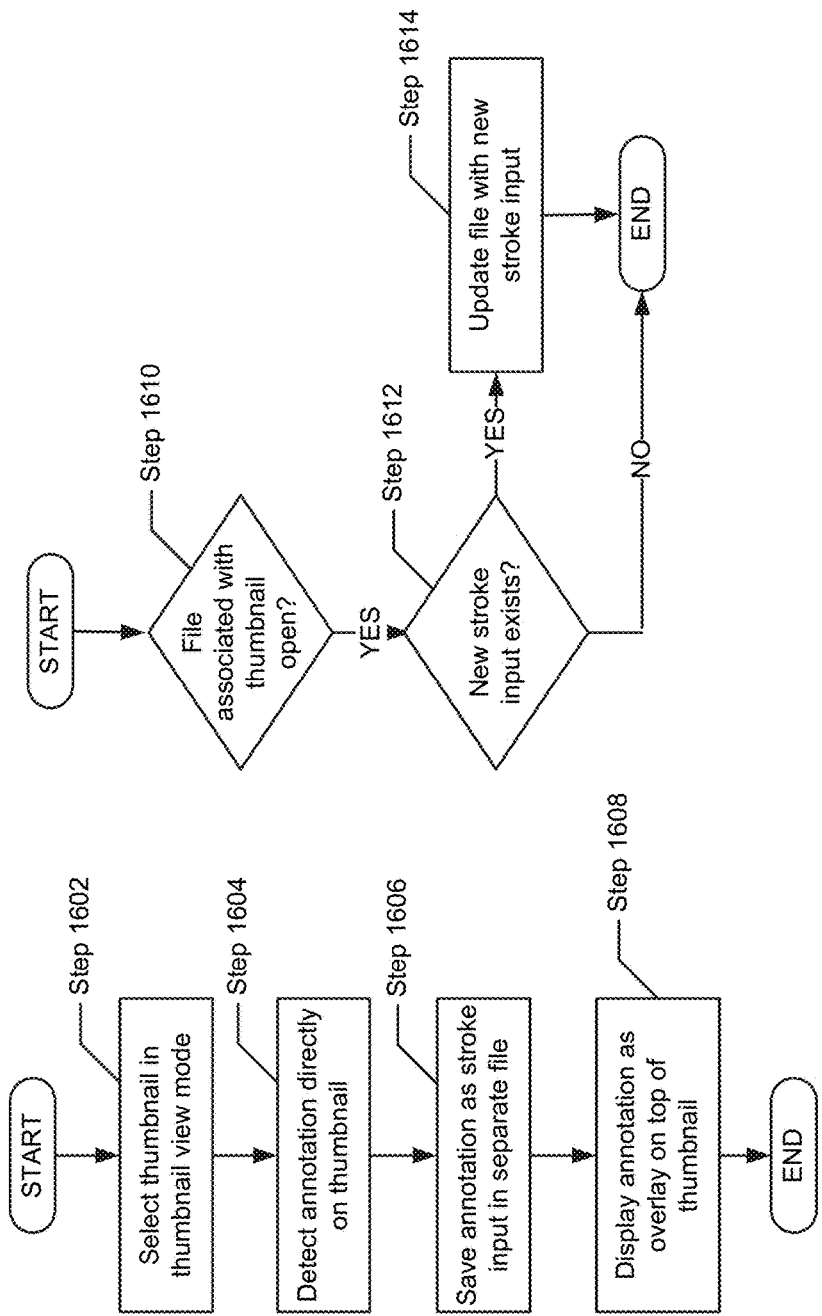

RESIZABLE, OPEN EDITABLE THUMBNAILS IN A COMPUTING DEVICE

BACKGROUND

In the early personal computers, users could only open, see and edit one file at a time. With the invention of graphic user interfaces in advanced operating systems, users were able to see and edit side-by-side two or more different open files. As graphical user interfaces became more sophisticated and different types of files became popular such as Microsoft Word and Excel, Adobe's PDF, etc. the technology evolved to allow replacing by default the icon that graphically represented the file by the file contents themselves. For example, some personal computers today display the first page of the PDF document as the icon that represents the small thumbnail of the PDF document. In addition, if the user hovers on top of a particular thumbnail of a multipage PDF file, a pair of arrows going back and forward appears, and the user may navigate inside that thumbnail and see a miniature version of all the pages in the PDF file, one file at a time.

If a user wants to edit or make a marking annotation on the PDF thumbnail, the user must first open the PDF file itself and then proceed to edit or mark the file. If the user wants to compare two or more files, he/she needs to also open the next file to edit and position them side by side to either compare or work on them simultaneously. Once the user has finished the editing, he/she may need to save the files. The saved files continue to be displayed on the graphic interface as only a thumbnail representation.

SUMMARY

In general, in one aspect, the invention relates to a non-transitory computer readable medium comprising instructions, which when executed by a processor perform a method for editing thumbnails, the method comprising: detecting an input action to resize a thumbnail associated with a file, wherein the thumbnail is a static image of at least a portion of at least one snapshot of file content in the file, and the thumbnail is displayed in a file directory on an interactive device, in response to the detecting, obtaining an expanded thumbnail, making a first determination that first viewport information of the expanded thumbnail does not exceed a predetermined threshold, generating, in response to the input action, a frontal transparent writing layer (FTWL) operatively linked with the expanded thumbnail, capturing, in the FTWL, at least one annotation made in a thumbnail region of the expanded thumbnail, and storing the at least one annotation and second viewport information for the at least one annotation in the FTWL.

In general, in one aspect, the invention relates to a non-transitory computer readable medium comprising instructions, which when executed by a processor perform a method for editing thumbnails, the method comprising: detecting an input action on a thumbnail associated with a file, the input action comprising at least one annotation directly on the thumbnail, wherein the thumbnail is an image of at least a portion of at least one snapshot of file content in the file, and the thumbnail is displayed in a file directory on an interactive device, saving the at least one annotation as a stroke input in a writing on top of thumbnails management utility (WTTMU) file, and displaying the at least one annotation as an overlay on top of the thumbnail in the file directory.

In general, in one aspect, the invention relates to a non-transitory computer readable medium comprising instructions, which when executed by a processor perform a method for editing thumbnails, the method comprising: detecting an input action for a thumbnail associated with a file, wherein the thumbnail is a static image of at least a portion of at least one snapshot of file content in the file, and the thumbnail is displayed in a file directory on an interactive device, saving an annotation resulting from the at least input action in thumbnails management utility (WTTMU) file, and displaying the annotation as an overlay on top of the thumbnail in the file directory.

Other aspects of the invention will be apparent from the following description and the appended claims.

BRIEF DESCRIPTION OF DRAWINGS

FIGS. 2A-2C show hardware for operating an electronic flipchart in accordance with one or more embodiments of the invention.

FIGS. 3A-3C show hardware for operating an electronic flipchart in accordance with one or more embodiments of the invention.

FIGS. 7A-7F show examples of an electronic flipchart in accordance with one or more embodiments of the invention.

FIG. 16A shows a flow charts for directly annotating a thumbnail in accordance with one or more embodiments of the invention.

FIG. 16B shows a flow chart for opening a file associated with an annotated thumbnail in accordance with one or more embodiments of the invention.

DETAILED DESCRIPTION

Figure 1:
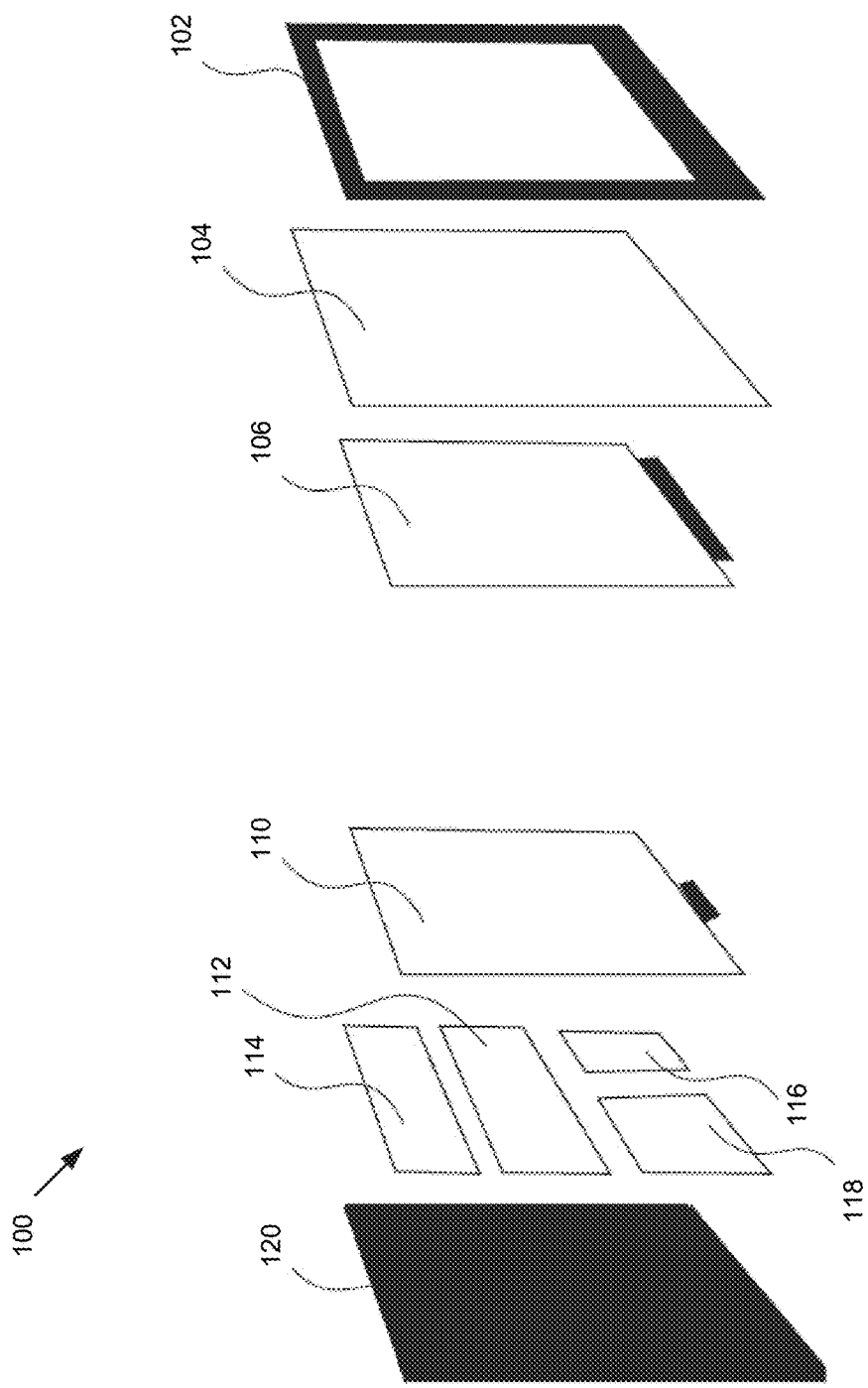
FIG. 1 shows an apparatus in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to generating thumbnails representing files stored in database or other repository. More specifically, embodiments of the invention are directed to creating snapshots of file content and using the snapshots to generate a thumbnail representation for each file. In addition, embodiments of the invention are directed to resizing thumbnails having thumbnail content from file snapshots, annotating on the thumbnails using an interactive device, and later synchronizing the annotations with the file content.

Interactive devices, as used in embodiments of the present disclosure, may include, for example, e-flipchart apparatuses, interactive boards, smart phones, tablets, laptops, desktop computers, interactive white boards, gaming devices, or any other interactive computing device having a display area or screen for displaying content.

In the description below, FIGS. 1-10 describe one form of an interactive device, i.e., the e-flipchart apparatus, in accordance with embodiments of the invention. More specifically, FIGS. 1-10 describe an active collaboration framework in which one or more interactive devices make up a multi-device workspace, where the interactive devices are linked in the multi-device workspace so that each device is aware of content generated on any other device in the multi-device workspace. The invention is not limited to workspaces that only include interactive devices that are e-flipchart apparatuses as described in FIGS. 1-10 below.

FIGS. 11-17G are directed to representing file content as thumbnails and annotating thumbnails directly on an interactive device, such as the e-flipchart apparatus described in FIGS. 1-10.

FIG. 1 shows a schematic diagram of an apparatus of an e-flipchart (also referred to as an e-flipchart apparatus) in accordance with one or more embodiments of the invention. While FIG. 1 shows a configuration of components, other configurations may be used without departing from the scope of the invention. For example, various components may be combined to create a single component. As another example, the functionality performed by a single component may be performed by two or more components.

Turning to FIG. 1, in accordance with one or more embodiments of the invention, the apparatus (100) may include one or more hardware elements, each having specific functionality. The main structure of the e-flipchart apparatus is formed between a back panel (120) and a front frame (102). In one or more embodiments of the invention, the front frame is a clear, opaque, or translucent material and includes an active area on which content may be displayed. In one or more embodiments of the invention, the back panel (120) is a rigid mechanical support structure made of a solid material, for example, plastic or metal. In between the back panel (120) and the front frame (102) is a low-power, reflective display (106). In one embodiment of the invention, the reflective display (106) may be viewed as an output device that, through reflection, harnesses ambient light in order to present content. For example, the reflective display (106) may host slow refresh rates, monochromatic coloring (e.g., black and white, or gray scale shading), and the presentation of low contrasting definition. However, on the other hand, the reflective display (106) may have one or more of the following features: (i) very low power consumption; (ii) the readability of content outdoors under sunlight; and (iii) the providing of strain relief on the eyes of a user. As such, in one embodiment of the invention, fundamental static digital media, such as monochromatic text and still images, may be delegated to a reflective display (106) for presentation. Examples of a reflective display include, but are not limited to, a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., Flap Display, digital micro-mirror device).

In one or more embodiments of the invention, at least one portion of the reflective display (106) of the e-flipchart apparatus may be bi-stable. In one embodiment of the invention, the reflective display may correspond to the reflective displayed described in U.S. Pat. No. 5,930,026. The invention is not limited to the reflective display described in the above referenced patent.

Continuing with the discussion of FIG. 1, in front of the reflective display (106) is a layer having at least one touch portion which may be a transparent rigid or semi-rigid board (104), or a frame that uses edge sensors, such as Infra-red or optical sensing technology. In another embodiment, the layer having at least one touch portion (104) may be a capacitive film layer. In one or more embodiments, the layer having at least one touch portion (104) may only cover a portion of the reflective display, with the remaining surface area of the reflective display (106) being covered by non-touch sensitive material which may or may not be clear, opaque, translucent, transparent and/or non-transparent. In the back of the reflective display (106) is an optional electromagnetic layer, which may be an electromagnetic board (110). By combining the electromagnetic layer (110) and the layer having at least one touch portion (104), at least a dual system for touch input is obtained. In one or more embodiments, touch input may include a finger(s) and/or a touch by a digital marker or digitizer.

In one or more embodiments of the invention, the electromagnetic layer (110) is configured to generate an electromagnetic field capable of detecting a digital marker or digitizer (see e.g., FIGS. 2A-3C) when such a tool is used to provide an input to the e-flipchart. The electromagnetic layer (110) includes wires (not shown) that allows the electromagnetic layer (110) to transmit and detect input signals. In one or more embodiments of the invention, the electromagnetic board (110) is configured to determine a position of the touch input (described above) on the e-flipchart by detecting pressure or changes in the generated electromagnetic field caused by a designated portion of the touch input, for example, the tip of a digital marker and/or pressure applied by one or more fingers.

In one or more embodiments of the invention, the front frame (102) includes an active area or region with an active display, and an active input method that includes at least two input capabilities: the ability to detect a digital marker or digitizer and the ability to accept touch input from one or more finger touch points. Further, the apparatus (100) is configured to respond to each detected input type (see e.g., FIG. 6). For example, detecting a digital marker input may result in a line being drawn on the reflective display, while touching the same area with a finger may pan or zoom the display area.

Continuing with FIG. 1, controller (114) includes hardware and software/firmware to control the overall operation of the e-flipchart. More specifically, the controller (114) may include one or more processors (CPUs), persistent storage, and/or volatile memory. Persistent storage may include, for example, magnetic storage, optical storage, solid state storage (e.g., NAND Flash, NOR Flash, etc.), or any combination thereof Volatile memory may include RAM, DRAM, or any combination thereof In one or more embodiments of the invention, all or a portion of the persistent storage and/or volatile memory may be removable. In one or more embodiments, the persistent storage may include software instructions for executing operations of the e-flipchart. Specifically, the persistent storage may be configured to store software and/or firmware specific to e-flipchart operations. In one or more embodiments of the invention, the built-in CPU/processors of the controller (114) may execute an operating system and the software which implements e-flipchart functionality.

The controller (including components therein) (114) is powered by a battery and/or a power supply (112). In one or more embodiments, controller (114) is configured to detect and process input signals. For example, when an object touches the layer having at least one touch portion (104), a signal is sent to the controller (114) for detection of the input type and processing of the input. Further, the controller is configured to store e.g., in persistent storage and/or volatile memory, each stroke (in the form of touch input or digital marker) after such an action is performed on the e-flipchart (100) (see e.g., FIG. 6). In other words, the controller (114) is configured to store each stroke or action as it is produced in the active area of the front frame (102) of the e-flipchart apparatus (100). In one or more embodiments of the invention, the controller (114) includes functionality to implement the methods shown and described in FIGS. 6-8.

Further, while the controller (114) has been described as a combination of hardware and software, the controller may be implemented entirely within hardware without departing from the scope of the invention.

In one embodiment of the invention, the e-flipchart may include one or more external communication interfaces (116). The communication interfaces permit the e-flipchart to interface with external components. The communication interfaces may implement any communication protocol, for example, Bluetooth, IEEE 802.11, USB, etc. The invention is not limited to the aforementioned communication protocols.

In one or more embodiments of the invention, the apparatus (100) of FIG. 1 is a lower-power reflective device that only draws power from the battery/power supply (112) when there is a screen refresh with new information displayed or when a user is drawing or inputting information in the apparatus. In other words, while the apparatus (100) is "always on" and in a mode that is ready to detect an input, the apparatus is in a low power state. When an input is detected by the apparatus (100) on the active area of the front frame (102), the e-flipchart apparatus is configured to change from the low power state to an active state and perform the methods described in FIGS. 6 and 8.

In one or more embodiments of the invention, the e-flipchart apparatus may be deemed to be in an active state when some or all the components on the e-flipchart apparatus are working accepting pen, touch, keyboard and LAN input, processing applications and/or saving data (and/or metadata) to memory. In the active state, the components of the e-flipchart apparatus are drawing energy from the controller (114). In contrast, the e-flipchart apparatus may be deemed to be in a low power state, (or ready-mode) when no pen, touch, keyboard or LAN inputs are detected (for at least a pre-determined period of time), but the apparatus still shows the last content displayed on it (or displays no content). In ready-mode, CPU processes are minimized, scan rate of finger and pen inputs are delayed and overall power consumption of the components in the e-flipchart apparatus are reduced, for example, by at least 50%. Power consumption may be reduced by a different amount without departing from the invention. For example, only the battery and the controller may be drawing power in ready-mode, reducing the overall power consumption of the e-flipchart apparatus to 40% relative to the power consumption of the e-flipchart apparatus when it is in the active mode. The management of the amount of power that is provided to components of the e-flipchart apparatus and the frequency of polling for input is performed by the controller (114). Specifically, the controller (114) may include an energy management process configured to control the state of various components of the e-flipchart apparatus based on whether the e-flipchart apparatus is in ready-mode or in the active mode.

To contrast the two states of the e-flipchart apparatus, in one or more embodiments of the invention, when the reflective display is in ready-mode, the polling for input occurs at a low frequency, for example, the apparatus may scan for input 2-10 times per second. However, once an input is detected by the apparatus, the apparatus may transition to an active state and increase polling to a higher frequency, e.g., 60-120 times per second, in order to capture all the input that may be occurring on the reflective display. Other polling frequencies may be used in the active state and/or in the ready-mode without departing from the invention.

In one embodiment of the invention, the term "low power state" is intended to convey that the power consumption of the e-flipchart apparatus in this state is relatively lower (or less) than the power consumption of the e-flipchart apparatus in the active state.

Though not shown in FIG. 1, the e-flipchart apparatus may include a camera for detecting certain types of input, e.g., a gesture interpretation.

In one or more embodiments of the invention, the e-flipchart is configured to enable a user to create, modify, store, and share an e-presentation. An e-presentation is described below in FIG. 4.

In one or more embodiments of the invention, the apparatus (100) of FIG. 1 is approximately 42 inches in diagonal with a 3:4 aspect ratio. Those skilled in the art will appreciate that the size of the e-flipchart apparatus is designed to mimic that of a typical paper flipchart; however, the dimensions and size of the reflective display apparatus of FIG. 1 may vary without departing from the scope of the invention. For example, additional dimensions may include 32" 4:3 aspect ratio for a personal sized flip chart, and 55" or 60" for larger collaborative surfaces. Even larger surfaces may vary the aspect ratio to allow for more usable width, without adding unusable height, such as a 9:16 ratio for an 80" diagonal size.

While FIG. 1 describes an e-flipchart with a series of components organized in particular manner, those skilled in the art will appreciate that the location of such various components in the e-flipchart, in particular, the reflective display (106), the layer having at least one touch portion (104), and the optional electromagnetic layer (110) may be arranged in different order without departing from the invention.

FIGS. 2A-2C shows the hardware for the digital marker or digitizer that may be used as one type of input capable of being detected by the e-flipchart apparatus described in FIG. 1 above. Specifically, FIGS. 2A-2C show a top view of the digital marker in the form of a cylinder (210). The top of the digital marker has an electronic eraser (202) and at least one button (206). In one or more embodiments of the invention, the button (206) is software programmable and, when pressed or otherwise activated, is configured to send one or more signals to the e-flipchart. For example, when the button (206) is pressed or otherwise activated, the button (206) may send a wireless signal that is detected by the e-flipchart. Those skilled in the art will appreciate that the button (206) may be hidden or built into the electronic eraser (202). Further, although only one button is shown in FIG. 2A-2C, the digital marker may include more than one button, where each button is separately programmable. In one or more embodiments, when the electronic eraser (202) comes into contact with the e-flipchart, the e-flipchart is configured to remove or otherwise clear content from the corresponding locations on the reflective display. Said another way, the electronic eraser (202) mimics the operation of a traditional eraser.

FIG. 2B shows a different orientation (i.e., a side view with a zero degree rotation of the cylinder) of the digital marker or digitizer, in which the button (206) is located at the side of the electronic eraser (202) rather than at the bottom of the electronic eraser (202). FIG. 2C shows another top view of the digital marker, in which the cylinder is rotated 90 degrees. In FIG. 2C, the button (not shown) is hidden from view.

FIGS. 3A-3C depict side views of the digital marker or digitizer in accordance with one or more embodiments of the invention. In FIGS. 3A-3C, the entire length of the cylinder (210) form of the digital marker can be seen. In FIG. 3A, on a top end of the digital marker, the electronic eraser (202) is shown. In addition, the tip (204) of the digital marker or digitizer is shown on a bottom end of the cylinder (210). The tip (204) material may be selected such that the tip (204) slides easily over the writing surface. Materials for the tip (204) may include, but are not limited to, high density polyoxyethylene, hard felt, elastomer, polyoxymethylene, polyacetal, or polyoxyethylene. Other materials may be used without departing from the invention.

In one or more embodiments of the invention, the tip (204) of the digital marker may be used to draw or write directly on the active area of the front frame (102) of the e-flipchart apparatus. In FIG. 3B, the button (206) is shown on a side of the cylinder (210) of the digital marker. In FIG. 3C, the tip (204) of the digital marker is shown as being thinner and sharper in comparison with the tip of FIGS. 3A-3B. Those of ordinary skill in the art will appreciate that the tip (204) of the digital marker is a hardware component that may be interchangeable and designed to mimic a pencil, pen, marker, stylus, or any other suitable writing tool having varying widths and sharpness. In FIG. 3C, the button is not shown.

While FIG. 3A-3C show a cylinder shape for the digital marker, those skilled in the art will appreciate that the shape of the digital markers may take other forms without departing from the scope of the invention.

As described above, users of the e-flipchart are able to create, display, store, modify, and share e-presentations. Each e-presentation includes one or more pages organized in a sequential manner. The controller includes functionality to store the information necessary to maintain the e-presentation and allow the user to interact with the e-presentation as described below. An exemplary e-presentation is shown in FIG. 4.

Figure 4:
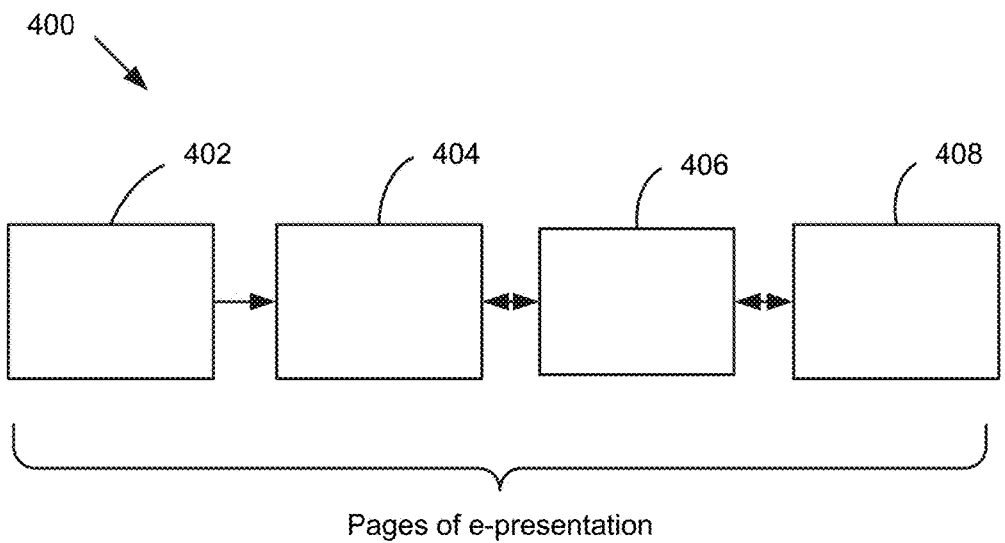
FIG. 4 shows a data structure for an electronic flipchart in accordance with one or more embodiments of the invention.

FIG. 4 shows an e-presentation (400) in accordance with one or more embodiments of the invention. The e-presentation may include one or more pages (402, 404, 406 408), where each page represents an electronic page of the e-flipchart. Each page of the e-presentation (400) corresponds to content that may be displayed on the e-flipchart apparatus. In one or more embodiments of the invention, the e-presentation (400) shown in FIG. 4 may be stored in memory or persistent storage associated with the e-flipchart apparatus or in a cloud computing environment to which the e-presentation is backed-up, or any combination thereof For example, the e-presentation may be stored in persistent storage locally, and mirrored in the cloud environment.

In one or more embodiments of the invention, the e-pages (402, 404, 406, 408) are linked as the e-presentation is populated, in real-time. The link between the pages is represented by the bi-directional arrows shown in FIG. 4. Specifically, the link between pages of the e-presentation and the metadata stored to track the various information associated with the e-presentation is shown in FIG. 5.

Figure 5:
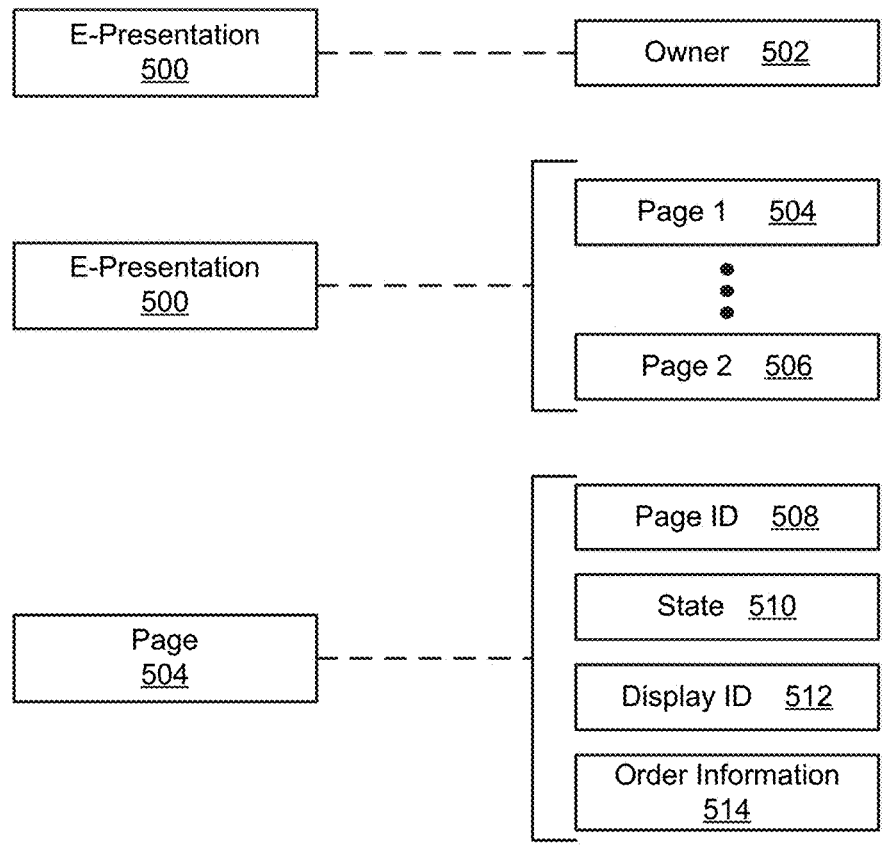
FIG. 5 shows data relationships for an electronic flipchart in accordance with one or more embodiments of the invention.

Specifically, in FIG. 5, each e-presentation (500) may be associated with an optional owner (502). In one or more embodiments of the invention, the owner (502) may be the entity or device on which the e-presentation is initially created. In this case, the owner (502) may be represented by a device ID which identifies the device on which the e-presentation is created. For example, when the e-presentation (500) is created on the e-flipchart apparatus, the owner (502) field may be populated with the local ID of the e-flipchart. Alternatively, the owner (502) may be an individual or group of individuals. In this case, the owner (502) may be represented by one or more user IDs. In one or more embodiments, although not shown, an e-presentation may also have permissions associated with the presentation as a whole, or each page of the e-presentation. Specifically, permissions to read/view/edit an e-presentation may be given by the owner (502) of the e-presentation (500), or by a user of the e-flipchart or other device that is specified as the owner of the e-presentation.

In addition, as shown in FIG. 4 above, the e-presentation (500) may be composed of one or more pages (e.g., Page 1 (504), Page N (506)). Each page (504, 506) is in turn associated with content (data) and metadata. For example, as shown in FIG. 5, page (504) has a page ID (508), a state (510), a display ID (512), and order information (514). The page ID (508) uniquely identifies that page in the e-presentation. The page ID (508) may be numerical, alphabetical, symbolic, or any combination thereof. In one embodiment of the invention, each page may be associated with a state (510). In such embodiments, the state (510) of the page (504) may be, but is not limited to, an active or an inactive state. An active state indicates that page (504) is currently displayed or being written to via the e-flipchart or via another device (see e.g., FIG. 10). An inactive state indicates that page (504) is part of the e-presentation but is not the page that is currently displayed (i.e., the page is not shown) or being written to. Those skilled in the art will appreciate that a page may be associated with other states without departing from the scope of the invention, such as for example, an edit state in which the page is being edited offline, or an offline state in which the page is linked to the e-presentation but is offline or stored in persistent memory.

In one embodiment of the invention, each page may be associated with a display ID (512). In such embodiments, the display ID (512) associates the page (504) with a display device. For example, in a scenario in which the page (504) is displayed on the e-flipchart, the display ID may be the ID of the e-flipchart. In an alternate embodiment, suppose page (504) is linked to an e-presentation currently being modified on the e-flipchart, but is not the active page of the e-presentation. In this case, the page (504) may be shared with second device over a network, so that the owner of the second device may edit the page (504) (see e.g., FIGS. 9A-9C, 10). In this scenario, the display ID (512) associated with the page (504) is the ID of the second device on which the page (504) is being edited. Accordingly, the display ID (512) of a page (504) linked to an e-presentation may change at any time. In one or more embodiments, there may be multiple display IDs (512), each one corresponding to a device that is currently viewing the page (504). Further, in one or more embodiments, the display ID may only be assigned when the state of a page is active. When the state of page is inactive, the display ID field in the data structure of the e-presentation may be null.

In one or more embodiments of the invention, the order information (514) of a page (504) links the page (504) to other pages in the e-presentation in a specific order and indicates how the pages of an e-presentation may be traversed. Specifically, the e-flipchart apparatus mimics use of a typical paper flipchart apparatus, in which a new page is obtained by flipping a current page over the flipchart apparatus. In the typical flipchart apparatus, the pages are flipped in an order, such that pages cannot be skipped to obtain a particular page of the e-presentation. Similarly, with the e-flipchart apparatus, each page (504) of the e-presentation may be linked to at least one page prior to the page (504) and at least one page following the page (504) in the e-presentation. In one or more embodiments of the invention, the order information (514) may include the page IDs of at least the page prior to the page (504) and the page following the page (504). Those skilled in the art will appreciate that the controller may facilitate skipping to a page out of order without departing from the scope of the invention.

In one or more embodiments of the invention, the metadata associated with an e-presentation, as shown in FIG. 5, may be populated and stored into a data structure as the e-presentation is created and modified. The data structure may then be stored locally in the e-flipchart apparatus persistent storage, or in a cloud computing environment. A specific example of how the data structure is populated is described in FIG. 8 below.

Figure 6:
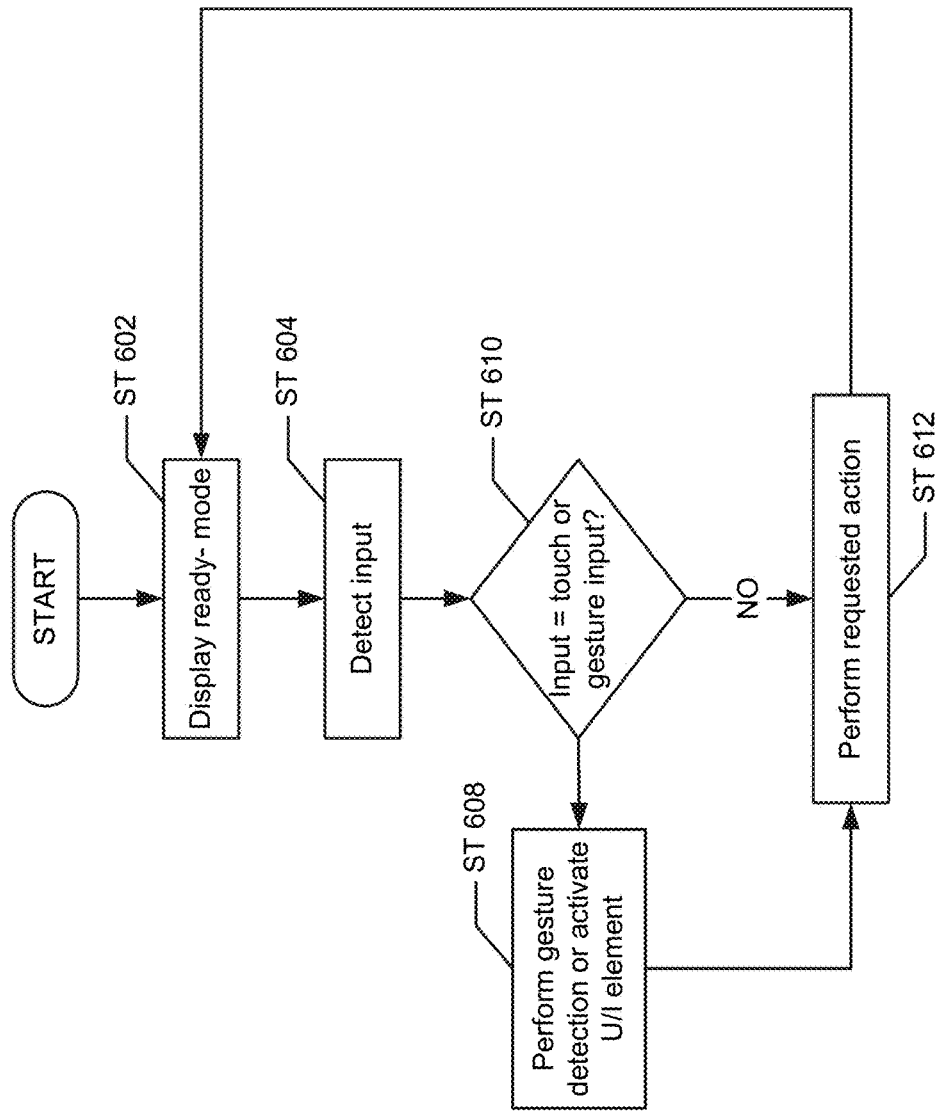
FIG. 6 shows a flowchart in accordance with one or more embodiments of the invention.

FIG. 6 shows a flow chart in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 602, the e-flipchart apparatus is in display ready-mode. As described above, the e-flipchart apparatus may be always "on," and therefore, ready for use when a user walks up to the apparatus or provides another type of input that is detected by the apparatus (Step 604). Specifically, in the ready-mode (or base state), the e-flipchart apparatus polls for an input at a low frequency or input scan rate. In this mode, the display area of the e-flipchart apparatus may include the image from the last time it was fully active. When an input is detected, the apparatus changes state from ready-mode to the active state. For example, in one or more embodiments of the invention, when input is sensed by the electromagnetic board, a signal is sent to a controller CPU which is running the energy management software to "wake up" some or all the components and put them in "active mode". The same process occurs when a signal is detected via a GUI, touch input, or in a "wake up on LAN" input.

The input detected by the e-flipchart apparatus in Step 604 may be a wireless input provided by the press of a button, such as a Bluetooth signal, radio frequency signal, or other wireless network signal, a digital marker input, a touch input, a gesture input, or any other suitable type of input. Based on the type of input detected, a specific action may be performed by the e-flipchart apparatus. Thus, upon detection of an input, a determination is made as to whether the input is a touch input or a gesture input (Step 606). If the detected input is a user gesture, the e-flipchart apparatus may be configured to perform gesture detection or activate a user interface (UI) component (Step 608). For all other input types, an appropriate action is performed by the e-flipchart apparatus (Step 610). For example, when the detected input is not a touch or gesture input, but rather, is a wireless signal, for example, a press of the button on the digital marker, corresponding external events may be activated (Step 610). For example, in Step 610, when the input is a Bluetooth signal, the e-flipchart apparatus may be configured to activate a peripheral device or external Bluetooth receiver. External event inputs may also be, in one or more embodiments of the invention, proximity sensors, motion sensors, sound sensors that detect sound above a particular decibel threshold, etc., for detecting the presence of one or more people close to or in the vicinity of the e-flipchart apparatus. For example, proximity sensors may include ultrasonic sensors or infrared sensors. In yet another embodiment of the invention, when the detected input is a pen stroke using a digital marker or digitizer, the e-flipchart apparatus may be configured to detect the path of the digital marker tip and convert the motion to a display of simulated ink strokes (Step 612). Accordingly, the specific action performed by the e-flipchart may vary depending on the type of input received.

When the detection input is a gesture or a touch input, the activated components may display data on the display area, flip a page, zoom into the content displayed, or perform any other suitable action in response to the touch/gesture input. In one or more embodiments of the invention, after performing the action in response to the detection of an input, the e-flipchart apparatus returns to the base state of "ready-mode." In one or more embodiments, in this mode the e-flipchart apparatus to continue to display an image without any power used by the bi-stable reflective display component of the apparatus. Examples of the types of actions that may be performed are described below in FIGS. 7A-7E.

Specifically, in one or more embodiments of the invention, FIG. 7A shows an example front frame (102) of an e-flipchart apparatus. The front frame (102) mimics a screen and has an area which is capable of accepting at least two type of input: touch and digital marker. When one of the aforementioned types of input is detected, for example in the active region or display area of the layer having at least one touch portion (104), an e-presentation (700) is created and displayed. Specifically, when a user walks up to the e-flipchart apparatus in ready-mode and provides an input, the e-presentation (700) is created. Creation of the e-presentation may include generating and populating the data and metadata shown in FIG. 5. In FIG. 7A, the display area is blank. In FIG. 7B, an example input of writing (702) using a digital marker (210) on the active area of the e-flipchart apparatus is shown. Specifically, in FIG. 7B, when the tip of the digital marker or digitizer (210) is pressed onto the active area of the e-flipchart apparatus, the path of the digital marker (210) is detected and converted by the software of the e-flipchart apparatus into simulated ink strokes (702) which are displayed on a first page of the e-presentation (700). FIG. 7C shows at least one embodiment in which the displayed stroke images are maintained on the e-flipchart apparatus without any power consumption by the reflective display component of the e-flipchart apparatus. In one or more embodiments of the invention, the reflective display displays the latest information that resulted from input to the e-flipchart, and does not change until new input is received by the controller.

Figure 7E:
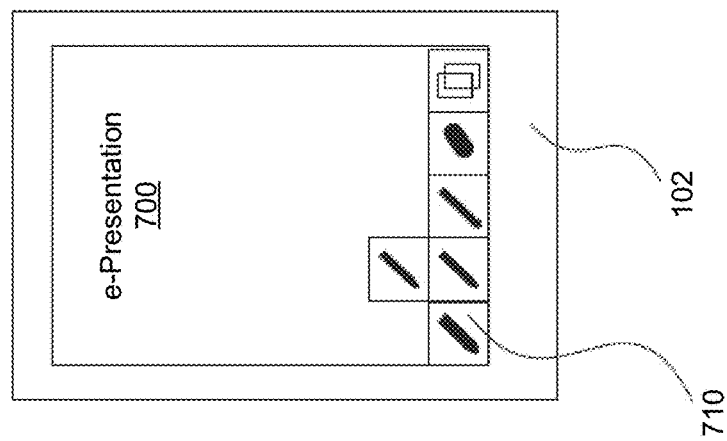
Figure 7D:
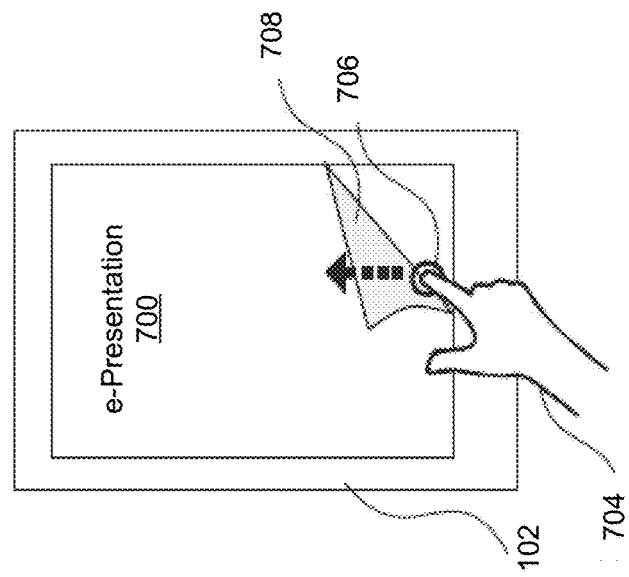

In FIG. 7D, a touch input (704) is detected by the e-flipchart apparatus. In the example shown, a user touches the display screen (706) and, in one or more embodiments, moves his/her finger in an upward motion (indicated by the arrow pointed upward), resulting in the current page (708) flipping over to begin a new page of the e-presentation (700). Those skilled in the art will appreciate that a page may be flipped using a gesture input as well, in addition to or instead of a touch display as shown in the example of FIG. 7D. For example, a visual gesture (e.g., movement of a hand in a particular path without touching the e-flipchart) which may be detected by the camera and that is interpreted as a page flip may result in the software interpreting the flip gesture as a page flip action. A page flip action results in transitioning from a current page to another page of the e-presentation. In FIG. 7E, a graphical user interface (GUI) (710) is displayed on the screen of the e-flipchart apparatus. The GUI (710) may be invoked by the pressing of a button on the digital marker, by a gesture, or by any other designated input. In one or more embodiments of the invention, the GUI (710) may be invoked from a menu on a secondary screen that is, for example, connected to a cloud server by a bi-directional communication channel In one or more embodiments, the GUI (710) may be used to select particular features or perform selected actions such as, for example, sharing the current page of an e-presentation, selecting an eraser, changing the font, style, or color of the displayed line strokes, etc.

Figure 7F:
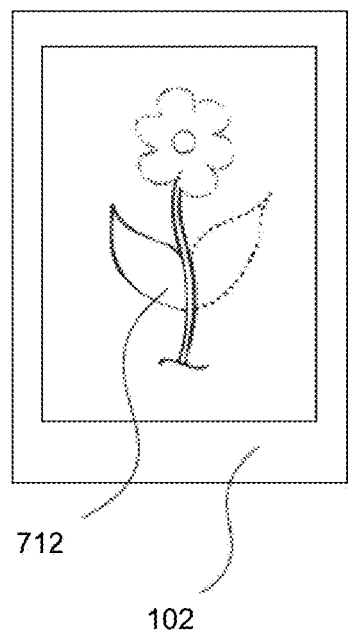

FIG. 7F shows an example of an e-presentation having a drawing. In one or more embodiments of the invention, as shown in FIG. 7F, the e-flipchart apparatus may display a pencil skeleton image (712) to aid a user in creating an e-presentation. The pencil skeleton may provide a light image so that a user may, at a later time, trace the light pencil drawing with a marker to draw a predetermined object. This feature may be used, for example, to create an illusion that the user is creating artwork on the fly. Although FIG. 7F shows a pencil skeleton of a flower, those of ordinary skill would appreciate that the pencil skeleton may depict any object, or may more generally provide any type of aid for writing or drawing. For example, the pencil skeleton may be a combination of light horizontal and vertical lines mimicking graph paper or notebook paper.

Figure 8:
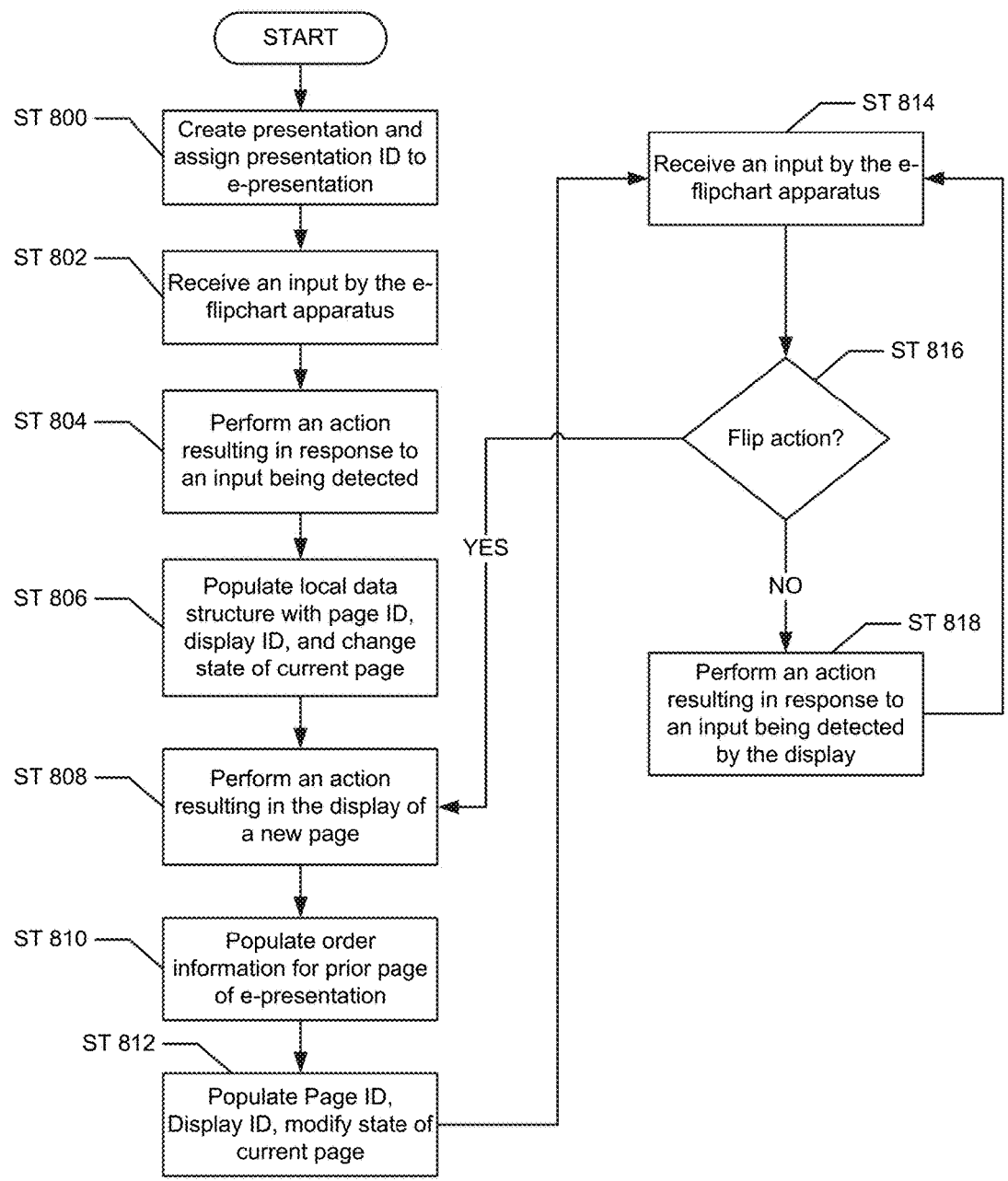
FIG. 8 shows a flowchart in accordance with one or more embodiments of the invention.

FIG. 8 shows a flow chart in accordance with one or more embodiments of the invention. Specifically, FIG. 8 shows a flowchart for creating and maintaining an e-presentation in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In step 800, an e-presentation is created and associated with a presentation ID. In one or more embodiments of the invention, the presentation ID may be assigned by an e-presentation server, or alternatively, may be generated by the e-flipchart or provided in response to an input prompt to the user. The e-presentation server may be a remote server that is connected to the e-flipchart apparatus via a network. The functionality and purpose of the e-presentation server is described below in FIG. 10. The presentation ID may be a numerical ID, alphabetical ID, a symbolic ID, or any combination thereof, and is configured to uniquely identify the e-presentation displayed on the e-flipchart apparatus. When an e-presentation is initially created, it may not contain any content. Further, if the e-flipchart apparatus does not receive any user input within a certain period of time, the e-flipchart apparatus may transition to ready-mode. In one embodiment of the invention, step 800 may be performed when the e-flipchart apparatus is in either ready mode or active mode.

In Step 802, an input is detected by the e-flipchart apparatus in ready-mode. In ready-mode, the apparatus is scanning for input at a low frequency, e.g., twice per second. As described above, the input detected by the reflective display may be a touch input, a digital marker input, a proximity sensor input (e.g., when a user approaches the e-flipchart apparatus), a network signal, or any other suitable type of input. As described above, when an input is detected, the apparatus changes state from ready-mode to the active state. For example, in one or more embodiments of the invention, when input is sensed by the electromagnetic board, a signal is sent to the controller CPU which is running the energy management software to "wake up" some or all the components and put them in "active mode". The same process occurs when a signal is detected via a GUI, touch input, or in a "wake up on LAN" input. Step 802 may also be performed when the e-flipchart apparatus is in active mode.

In step 804, an action is performed in response to the received input. For example, the corresponding action may be to activate one or more components of the e-flipchart apparatus, convert input strokes to display rendered stroke images, display a GUI, share information with another device, etc. In one or more embodiments of the invention, when the input is received via a digital marker on the surface of the apparatus, the apparatus may identify a tip width of the digital marker via various methods. For example, the electromagnetic board may detect the tip width of the digital marker. Alternatively, the layer having at least one touch portion may be configured to detect the tip width of the digital marker. In yet another embodiment, the digital marker may transmit a signal to the apparatus that includes information about the tip width. In one or more embodiments of the invention, using information about the tip width associated with the input received, the apparatus may be configured to display a certain line width for rendered strokes.

In Step 806, a data structure (shown in FIG. 5, for example) for storing metadata associated with the e-presentation is populated with a page ID and a display ID. In addition, the state of the current page with the page ID is changed to active. In one or more embodiments of the invention, the data structure may be populated and stored locally, in the memory associated with the e-flipchart apparatus, or may be stored remotely, for example, in an e-presentation server or cloud computing environment. If the data structure is stored locally, the data structure may be backed-up (e.g., mirrored) on a remote server or in the cloud computing environment. At this stage, various actions may be performed resulting in writing or drawing on the current page. In step 808 an input resulting in display of a new page may be detected. For example, a touch input or gesture which results in a page flip.

In step 810, when a second page is created as part of the e-presentation, the data structure is populated with order information, linking the first page to the new second page in the e-presentation. In step 812, the new page of the e-presentation may be assigned its own page ID, following that of the first page ID, and display ID. In addition, the state of the first page is changed to inactive, and the state of the current page, i.e., the second page, is changed to active. In step 814, input is received by the e-flipchart apparatus.

In step 816, a determination is made as to whether the input received in Step 814 is a page flip action. If a page flip action is detected, the method proceeds to Step 808 and the data structure continues to populate itself with a third page ID and ordering information for the second page is updated to reflect the link to the third page. This process may repeat each time a page flip action is detected by the e-flipchart apparatus. Alternatively, if no page flip action is detected, then the process proceeds to step 818. In step 818, an action corresponding to the input received is performed. In one embodiment of the invention, the process may not end (i.e., various steps in FIG. 8 may be repeated), because the e-flipchart apparatus does not turn "off." Rather, when input is not detected for a predetermined amount of time, the e-flipchart apparatus returns to "ready-mode" and waits for an input (Step 814).

Figure 9A:
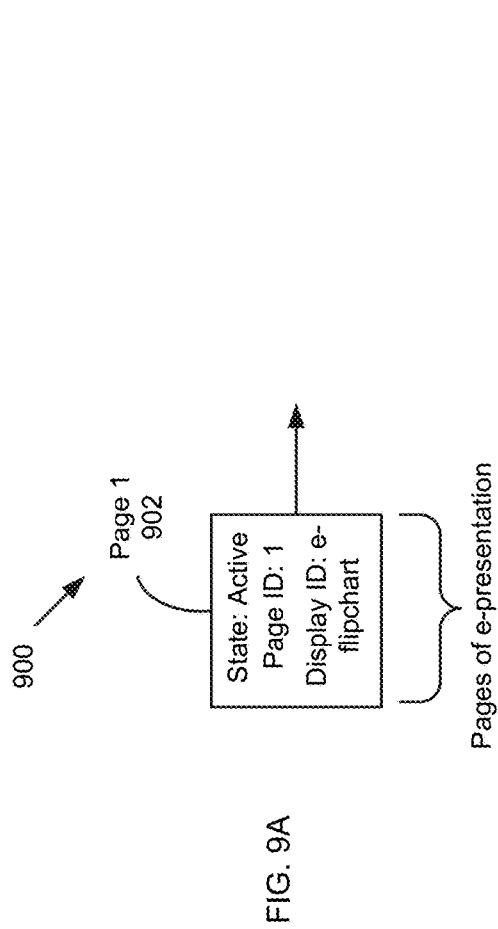
FIGS. 9A-9C show examples of storing data for an electronic flipchart in accordance with one or more embodiments of the invention.

FIGS. 9A-9E show examples of the method described in FIG. 8 above in accordance with one or more embodiments of the invention. In FIG. 9A, consider a scenario in which an e-presentation is created by the e-flipchart apparatus. At some point after the e-presentation is created, assume that a user walks up to the e-flipchart apparatus and provides an input in the form of pressing a button on or writing with a digital marker. Once the input is detected, the action associated with the input is interpreted and, in this example, result in content being associated with the first page (902) of the e-presentation. The first page (902) (i.e., the page on which characters are written, for example) is displayed on the active area of the e-flipchart apparatus with a white background. At this stage, the data structure (900) which stores metadata associated with the e-presentation begins to be populated with metadata. As shown in FIG. 9A, the metadata associated with page 1 (902) includes the state of active, a page ID of 1, and a display ID that identifies the e-flipchart apparatus. The owner ID of the e-presentation may also be the ID of the e-flipchart apparatus, or may be null for purposes of this example. Those skilled in the art will appreciate that no order information exists for a single page e-presentation.

Figure 9B:
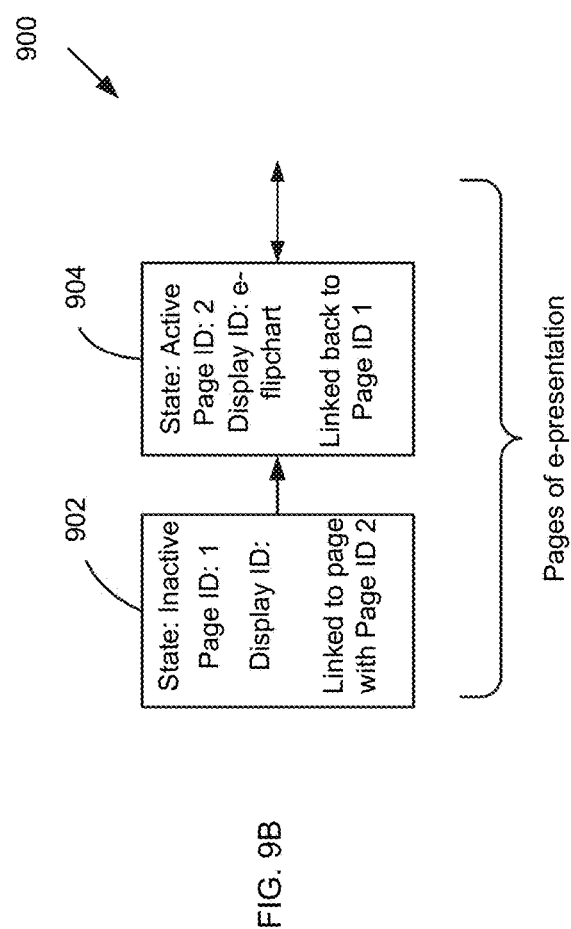

Now suppose the user gestures or provides a touch input which the software of the e-flipchart apparatus interprets as a page flip action. As shown in FIG. 9B, a second page is added to the e-presentation, and the metadata for both page 1 (902) and page 2 (904) is updated/populated in the data structure (900). Specifically, the state of page 1 (902) becomes inactive as it is no longer the page that is displayed. Further, the display ID field of page 1 (902) is updated to null. Order information is added to page 1 (902) linking the page to the second page (904) in order. For page 2 (904), an active state is retained, a new page ID is assigned and the display ID is updated to be the ID of the e-flipchart apparatus. Order information for page 2 (904) is populated to reflect that page 2 (904) is linked to page 1 (902). More specifically, page 2 (904) comes after page 1 (904). The order information becomes important when a page flip action is performed. Specifically, during normal operation, because the e-flipchart apparatus mimics a traditional paper flipchart, pages must be flipped in order (i.e., when using the page flip action, one cannot jump from page 1 to page 4, for example, without also flipping pages 2 and 3, although pages may be flipped in groups).

Figure 9C:
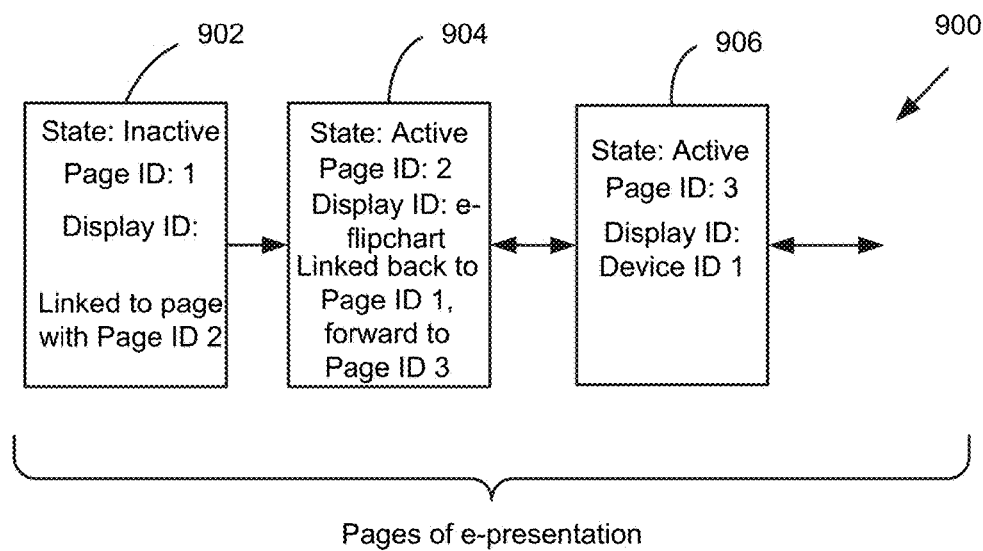

Continuation with the example, FIG. 9C depicts the metadata associated with an e-presentation that is shared with other owners/devices in order to collaborate on the e-presentation. In FIG. 9C, a third page (906) is added to the e-presentation. In this example, the third page is shared directly with another device (Device 1), while the second page (904) is still displayed on the active area of the e-flipchart apparatus. Device 1 (not shown) may be any smart phone, tablet, laptop, or desktop computer, a smart/interactive white board, or any other suitable device capable of displaying content and connecting to the e-flipchart apparatus or the shared e-presentation server (1002). Further, Device 1 may be connected to the e-flipchart apparatus via a point-to-point or a network connection that may be wired or wireless, such as via the Internet, or indirectly connected via a cloud server. Continuing with the data structure (900) content, the first page (902) remains inactive, and the second page (904) is updated to reflect that it is linked to page 1 (902) before and page 3 (906) after. In one or more embodiments of the invention, the state of the third page is also active, because even though it is not displayed on the e-flipchart apparatus, it is being displayed on another device (i.e., Device 1). Accordingly, the Display ID of the third page (906) is Device ID 1, which identifies Device 1.

Those skilled in the art will appreciate that page 3 (906) of the e-presentation as described in FIG. 9C above may be shared locally (i.e., in the same room with others viewing the e-presentation) or remotely (i.e., via a network connection to someone viewing the e-presentation on a remote device). Further, information may be sent and received by Device 1 and the e-flipchart apparatus bi-directionally, either through a server configured to store and manage the entire e-presentation file, or directly. Accordingly, a portion of or the entirety of e-presentations created on the e-flipchart apparatus may be shared and edited by a plurality of devices, all connected to the e-flipchart apparatus or to a shared e-presentation server. This allows for collaboration with audience members who are not physically located in the room where the e-flipchart is located.

Figure 10:
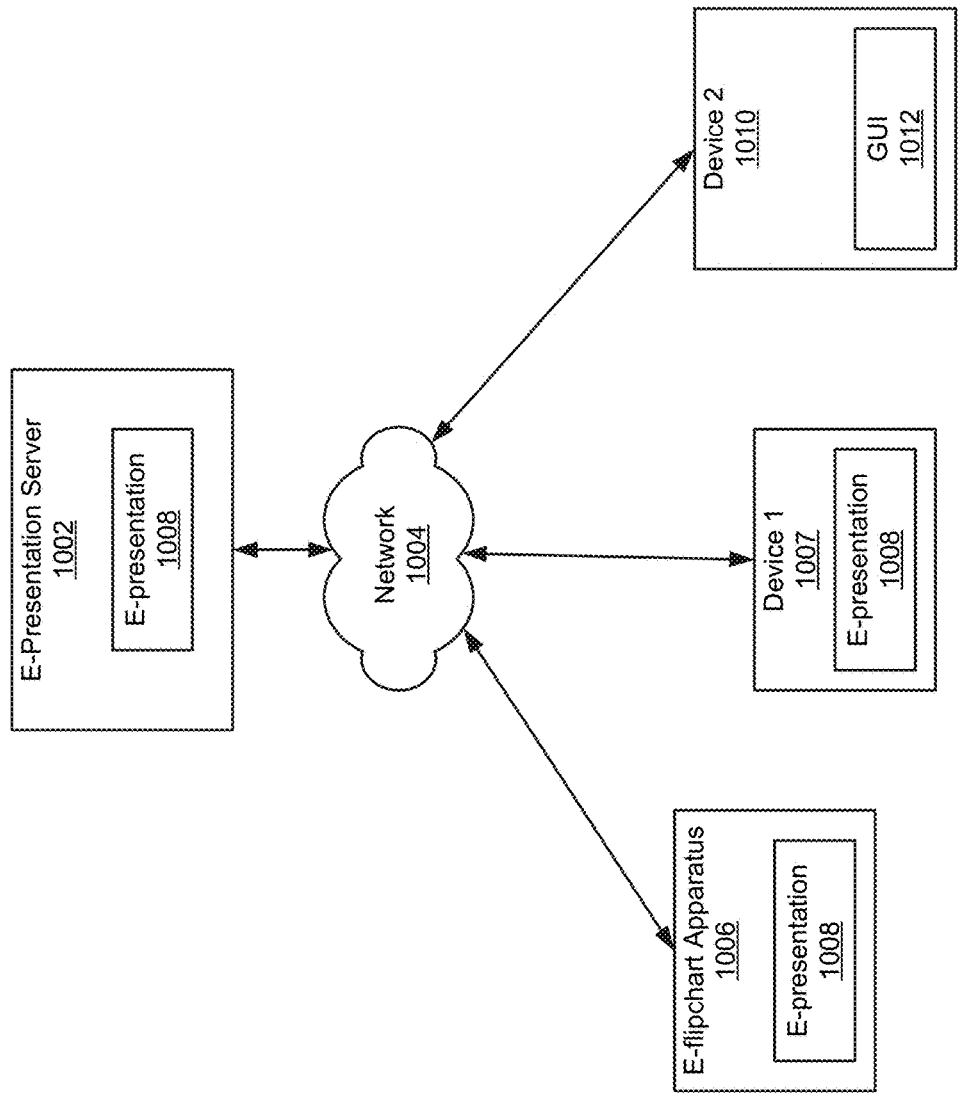
FIG. 10 shows a system for collaboration using an electronic flipchart in accordance with one or more embodiments of the invention.

FIG. 10 shows a system for sharing an e-presentation created on an e-flipchart apparatus in accordance with one or more embodiments of the invention. Specifically, FIG. 10 shows an e-presentation server (1002) connected via a network (1004) to the e-flipchart apparatus (1006) on which an e-presentation (1008) is created. In one or more embodiments of the invention, the e-presentation server (1002) may be a remote server configured to store and manage the e-presentation as a shared file. For example, the e-presentation server may be a cloud computing server or any other suitable type of server. In such cases, as shown in FIG. 10, the e-presentation server includes a copy of the e-presentation (1008). In one or more embodiments of the invention, the e-presentation server (1002) is configured to assign an e-presentation ID to an e-presentation when it is created or displayed on the e-flipchart apparatus display (1006). All the pages of an e-presentation are then associated with this e-presentation ID. In addition, the e-presentation server (1002) is configured to enforce the permissions of the e-presentation and may maintain and/or back-up the data structure (see e.g., FIG. 5) that is created for each e-presentation. The e-presentation server (1002) may also be configured to synchronize a shared e-presentation based on multiple contemporaneous inputs from other devices (e.g. 1007) connected to the same e-presentation.

In one embodiment of the invention, if multiple devices are concurrently editing an e-presentation, then when a specific device makes a change to the e-presentation, the device sends an incremental update to the e-presentation server (1002). In response to receiving the update, the e-presentation server updates its copy of the e-presentation and then sends the incremental update to all other devices (except the device that sent incremental update).

Continuing with the discussion of FIG. 10, the network (1004) may be any wired or wireless network configured to facilitate bi-directional communication between the e-presentation server (1002) and the e-flipchart apparatus and directly between device 1 (1007) and device 2 (1010). As described above, the network (1004) may be the Internet or any other suitable network. Device 1 (1007) and Device 2 (1010) may be local devices in the same room as the e-flipchart apparatus, or remote devices all connected to the e-flipchart apparatus via the e-presentation server (1002). Device 1 (1007) and Device 2 (1010) may be tablets, smart phones, laptops, desktop PCs, a wearable device, such as an interactive watch or bracelet, or any other suitable device. Alternatively, one or more of Device 1 (1007) and Device 2 (1010) may be additional e-flipcharts. The system of FIG. 10 allows users to see and collaborate on e-presentations that may be updated by a remotely connected device in real-time. The following example illustrates this concept using the components of FIG. 10.

Suppose that Device 1 (1007) is in the same physical location as the e-flipchart (1006) and Device 2 (1010) is a remote device. A presenter/user of the e-flipchart apparatus (1006) may, while editing or showing the e-presentation, invite audience members to collaborate and provide input in the form of writing or drawing into the e-presentation that has been created and is being presented on the e-flipchart apparatus. In this case, the presenter/user may provide an input that results in Device 2 (1010) being granted permission to edit the e-presentation. In such scenarios, Device 2 (1010) may connect to the e-presentation server via the network (1004), download the e-presentation, and then edit the e-presentation concurrently with Device 1 (1008) and e-flipchart apparatus (1006). When Device 2 (1010) is finished editing, the e-presentation server may delete the Device 2 Display ID. Multiple pages of the e-presentation may be shared individually, or the entirety of the e-presentation may be shared using the system of FIG. 10. Further, multiple pages of an e-flipchart apparatus may be edited in parallel, and the e-presentation server may be configured to synchronize the e-presentation when editing is completed.

In an alternative embodiment, Device 2 (1010) may display a GUI (1012) on its screen with various buttons for different functions, one of them being a button with a page flip function. Using the GUI, Device 2 (1010) may manipulate what is being displayed on the active area on the e-flipchart apparatus, without having actual editing capability. In order for Device 2 (1010) to manipulate the content displayed on the e-flipchart, Device 2 (1010) must be connected to the e-flipchart apparatus (1006) or to the e-presentation server (1002). The connection may be wireless or wired. In this scenario, the owner of the e-presentation may provide Device 2 (1010) with the GUI by providing an input that allows Device 2 viewing permissions, but not editing permissions.

Those skilled in the art will appreciate that the e-flipchart apparatus may be used in any suitable environment, for example, where traditional paper flipcharts would conventionally be useful. For example, the e-flipchart apparatus may be used in conference rooms, classrooms, boardrooms, or any other suitable environment. In one or more embodiments of the invention, the e-flipchart apparatus is designed to connect to the outside world using digital technology such as network connections, and to keep a written record of what was written on the apparatus. In addition, with the e-flipchart apparatus of the present invention, the ability to create and store a presentation before it is presented before an audience on the e-flipchart apparatus is available. For example, the e-flipchart apparatus may have removable memory on which a presentation may already be created and stored, and when the removable memory is installed into the e-flipchart apparatus, the pre-created e-presentation may be shown on the reflective display. E-presentations created using the e-flipchart apparatus may be stored, copied, shared, revised, transferred, and managed using the information described above. Moreover, because the e-flipchart apparatus uses a reflective display, it mimics the look and feel of traditional paper flipcharts.

Figure 11:
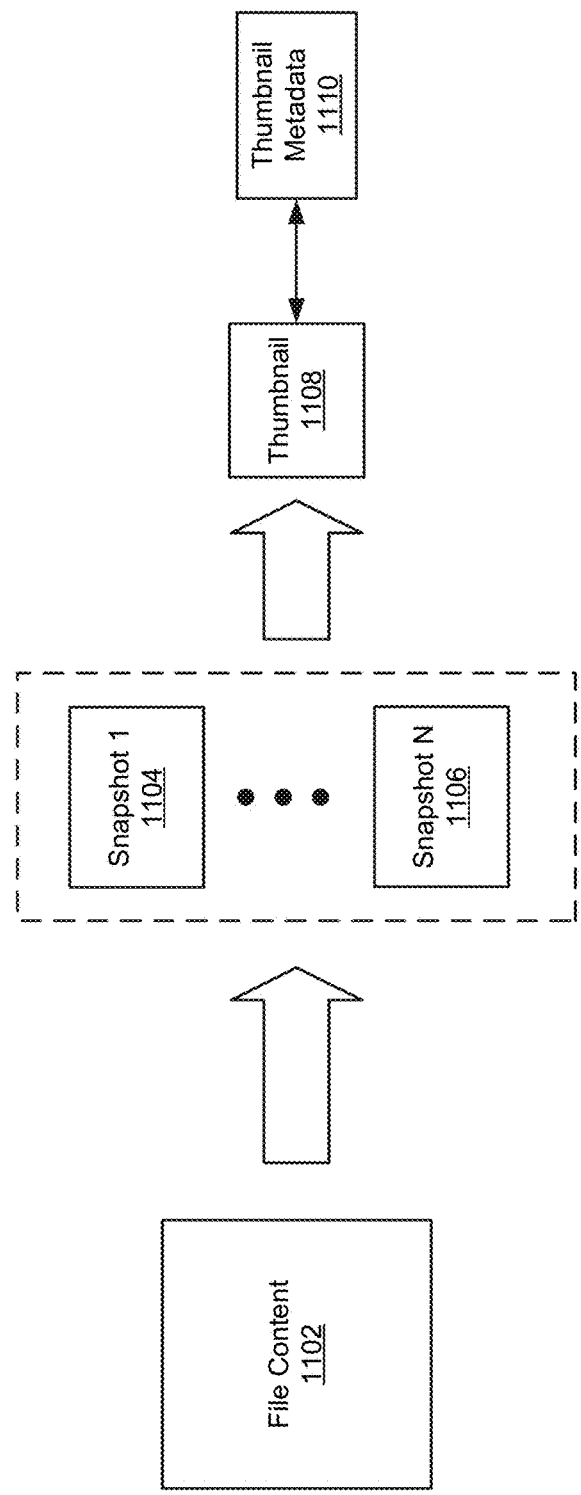
FIG. 11 shows a resizable thumbnail associated with a file in accordance with one or more embodiments of the invention.

FIG. 11 shows a flow diagram for creating thumbnails in accordance with one or more embodiments of the invention. Specifically, in one or more embodiments of the invention, thumbnails are created from snapshots (1104-1106) of file content (1102). File content (1102) may be of any visual type, such as images, text, spreadsheets, slides, hand drawings, and the like. . In one or more embodiments of the invention, file content (1102) may be one or more pages, or one or more portions of a page, of an e-presentation, for example.

A snapshot of a file (e.g., 1104-1106) represents the file content of that file at a particular point in time, when the snapshot is taken. A snapshot (e.g., 1104-1106) of a file may include all of the file content (1102), or some portion of the file content (1102). More specifically, a snapshot (e.g., 1104-1106) is an image of some or all of the file content at a particular point in time. There may be multiple snapshots (e.g., 1104-1106) of file content in a file. For example, in one or more embodiments of the invention, when a file has multiple pages of file content (1102), snapshot 1 (1104) may represent an image of the first page of the file content (1102), snapshot 2 may represent an image of the second page of the file content (1102), etc., until snapshot N (1106), representing an image of the last page of the file content (1102). Thus, in one or more embodiments of the invention, the number of snapshots associated with a file may be directly proportional to the size of the file. Alternatively, the number of snapshots associated with a file may have nothing to do with the size of the file, but rather, may be based on individual annotations made on a single page, for example.

In one or more embodiments of the invention, each snapshot (e.g., 1104-1106) is stored as a GIF image, and may be associated with the file from which the snapshot is derived as file metadata. As a file is updated with additional content, more snapshots may be taken. In addition, if existing file content is modified, original snapshots may be replaced by newer snapshots. Those skilled in the art will appreciate that other image types may be used to create snapshots, such as but not limited to: PNG images, JPEG images, BPG images, or any other suitable image type.

Continuing with FIG. 11, in one or more embodiments of the invention, the one or more snapshots (1104, 1106) are used to generate a thumbnail (1108) representing an image of the file content. More specifically, a thumbnail (1108) may be a scaled-down static bit image of a portion of a snapshot (1104, 1106) associated with the file. Accordingly, a thumbnail (1108) is an image that is created using at least a portion of one or more snapshots associated with the file content (1102).

In one or more embodiments of the invention, a thumbnail (1108) generated from a portion of one or more snapshots may include a border or other type of delineation around the image (not shown) that is the thumbnail representing the corresponding file. When such a border exists, the border may represent the thumbnail and the image inside the border may be called thumbnail content, i.e., an image of a portion of one or more snapshots of the file content.

In one or more embodiments of the invention, the snapshots from which a thumbnail may be generated are stored in memory locally in or on the e-flipchart apparatus/interactive device, thereby permitting quick access to thumbnail content when a thumbnail is expanded. For example, in one or more embodiments of the invention, the snapshots may be stored in cache memory. The expansion of thumbnails in accordance with embodiments of the invention is described below in FIG. 13B.

A thumbnail (1108) may be associated with thumbnail metadata (1110). Thumbnail metadata (1110) may include, for example, viewport information of the one or more snapshots of file content from which the thumbnail was created. In one embodiment of the invention, viewport information describes the perspective of the portion of the file content visible to a user and, thus, displayed on a device. Moreover, viewport information may be different for every interactive device and is subject to the preferences of a user at any given time. For example, viewport information may be affected by the device display screen size, the device display screen orientation, and other device specific parameters. With this in mind, because viewport information may be particular to the device, in one embodiment of the invention, viewport information associated with a given device may be stored on the given device. In one embodiment of the invention, viewport information may include content scaling information (or a zoom factor which is applied to the snapshot of file content displayed in the thumbnail image). For example, viewport information for a particular device may be a zoom factor of 75%, indicating that the device is viewing the file content, or a portion of the file content, at 75% zoom. Additional and/or alternative information (e.g., page ID, window width, window length, orientation, aspect ratio, reference coordinates, etc.) may be included as or be relevant to viewport information without departing from the invention.

In addition to viewport information, thumbnail metadata may also include, for example, the location of the thumbnail in memory, the associated file ID, etc. In some embodiments of the invention, the viewport information may also represent a zoom factor and coordinates related to one or more corners of the image displayed in the device.

FIGS. 12A-12D show examples of thumbnails associated with a file in accordance with one or more embodiments of the invention. In the example of FIGS. 12A-12D, file content (1202) is shown as a drawing of a house and a circle.

This file content (1202) is shown as being on a single page; however, those of ordinary skill in the art will appreciate that the house drawing may be on page 1 of the file, and the circle drawing may be on page 2 of the same file.

Further, in FIGS. 12A-12D, a snapshot (1205) is taken of the entire file content. FIGS. 12A-12D show how different portions of the snapshot (1205) may be used to generate a thumbnail representing the file content. As described above, the snapshot (1205) is stored as a GIF image, and thumbnails may be scaled-down versions of all or a portion of the GIF image. Although FIGS. 12A-12D describe an example where only a single snapshot (1205) is taken for all of the file content, those skilled in the art will appreciate that when file content includes multiple pages, for example, multiple snapshots (one per page of the file content) may be taken, any portion(s) of which may be used to create a thumbnail representing the file.

Figure 12A:
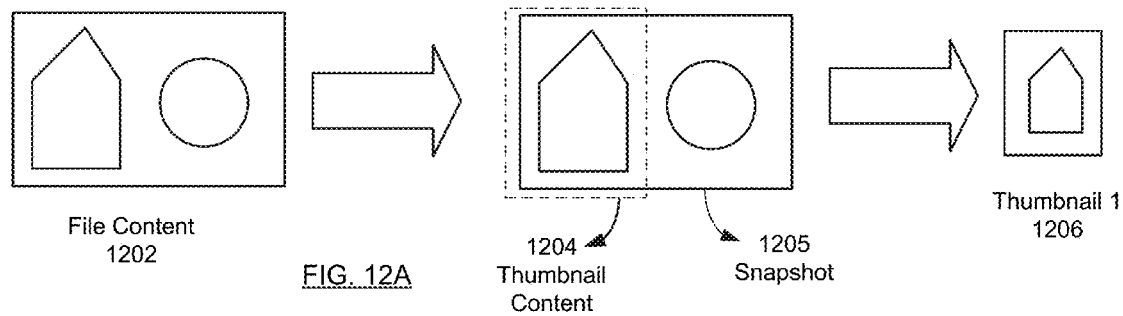
FIGS. 12A through 12D show examples of thumbnails associated with a file in accordance with one or more embodiments of the invention.

In FIG. 12A, the thumbnail content (1204) is shown as being only the house portion of the snapshot (1205). Specifically, thumbnail 1 (1206) is shown as a scaled-down image of the house portion of the snapshot (1205).

Figure 12B:
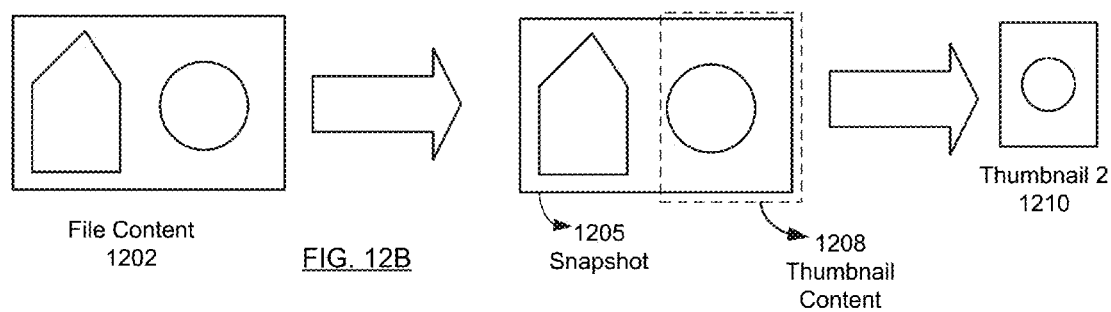

In FIG. 12B, the thumbnail content (1208) is shown as being only the circle portion of the snapshot (1205). Specifically, thumbnail 2 (1210) is shown as a scaled-down image of the circle portion of the snapshot (1205).

Figure 12C:
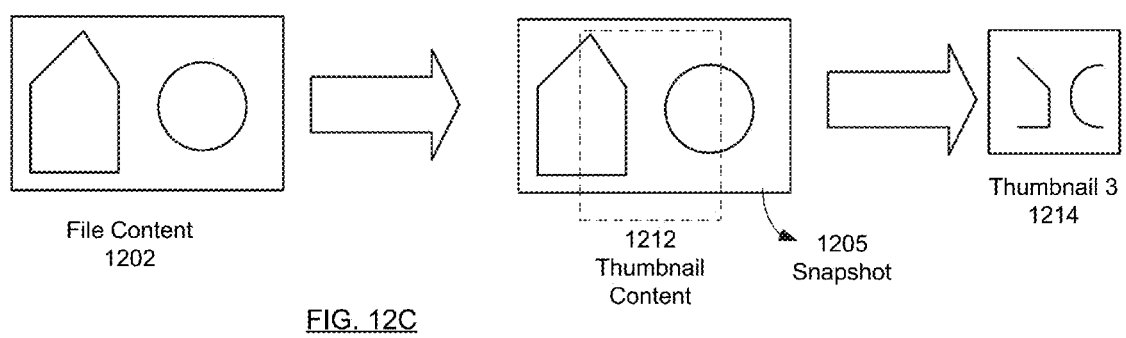

In FIG. 12C, the thumbnail content (1212) is shown as being half of the house drawing and half of the circle drawing in the snapshot (1205). Specifically, thumbnail 3 (1214) is shown as a scaled-down image of half of the house and half of the circle.

Figure 12D:
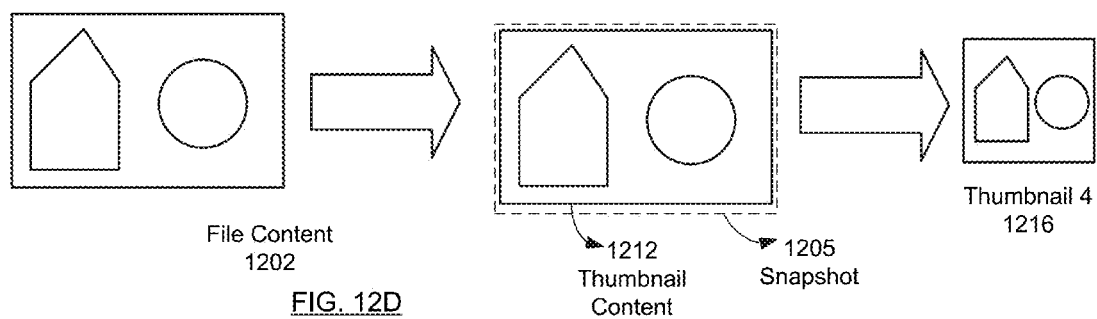

Lastly, in FIG. 12D, the thumbnail content (1212) is shown as the entire snapshot (1205), and correspondingly, thumbnail 4 (1216) is shown as a scaled-down image of all of the file content (1202). In one or more embodiments of the invention, thumbnail 4 (1216) may also be an image of a portion of snapshot (1205), even though the entire snapshot is used to generate thumbnail 4 (1216). In this case, thumbnail 4 may be navigated, or scrolled, to view other portions of the snapshot used to create thumbnail 4 (1216). In one or more embodiments of the invention a thumbnail may be navigated either by page or by moving viewport information on a virtual canvas.

Those skilled in the art will appreciate that thumbnail 1 (1206)—thumbnail 4 (1216) are meant to illustrate different options for generating a thumbnail having an image of one or more snapshots of the file content. Further, other options for a thumbnail representation of file content may also exist, without departing from the scope of the invention. Further, although the above discussion focused on a single snapshot taken of the all of the file content, those skilled in the art will appreciate that multiple snapshots may be taken of file content, for example, when there are multiple pages of content in the file. In this case, in one or more embodiments of the invention, the thumbnail image used to represent file content may be a tiled representation of at least a portion of each snapshot taken of the file.

Figure 13A:
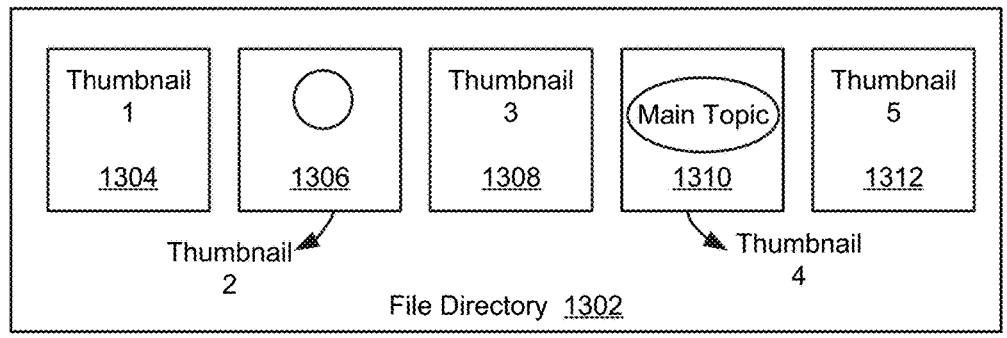
FIG. 13A shows a file directory with a plurality of thumbnails in accordance with one or more embodiments of the invention.

FIG. 13A shows a file directory (1302) in accordance with one or more embodiments of the invention. A file directory (1302) may be any directory structure which has a listing of the files stored in a database or other repository. In one or more embodiments of the invention, the file directory (1302) shown in FIG. 13A shows thumbnail representations of each file, also known as the thumbnail view mode. Specifically, the file directory (1302) of FIG. 13A shows thumbnail 1 (1304, thumbnail 2 (1306) with an image of a circle, thumbnail 3 (1308), thumbnail 4 (1310) having an image of the phrase "main topic" with an oval around the text, and thumbnail 5 (1312).

Figure 13B:
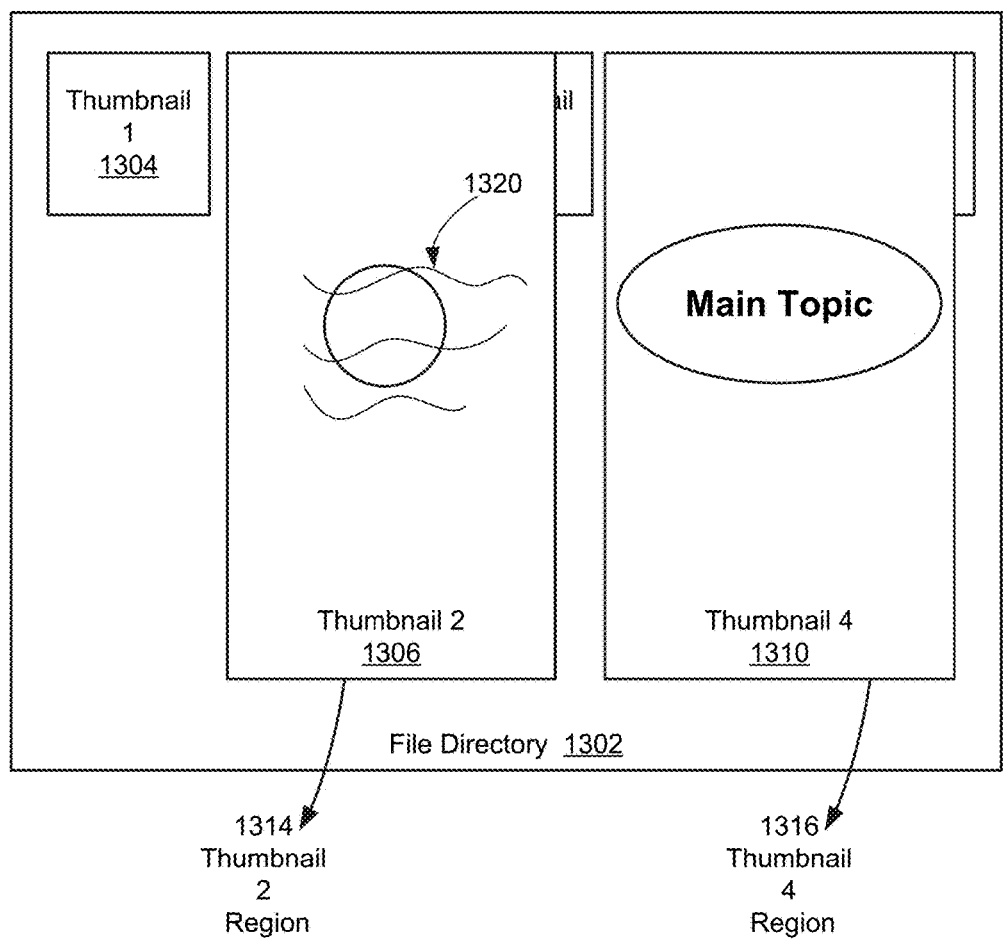
FIG. 13B shows an example of expanding thumbnails in a file directory in accordance with one or more embodiments of the invention.

FIG. 13B shows the same file directory (1302) in thumbnail view mode, where thumbnail 2 (1306) and thumbnail 4 (1310) are expanded. In one or more embodiments of the invention, each thumbnail image is resizable. In one or more embodiments of the invention, a thumbnail may be resized by performing an action or a gesture input on the interactive device. Those skilled in the art will appreciate that resizing a thumbnail may also be performed by some resizing operation, such as dragging the border of the thumbnail (when such a border is present) with a digital marker, pen, a mousepad, one or more fingers or touch control associated with the interactive device, or any other suitable input tool.

In one or more embodiments of the invention, resizing a thumbnail may re-scale the image that forms the thumbnail. For example in FIG. 13B, the circle image of thumbnail 2 (1306) is larger or more zoomed in than that shown in FIG. 13A. Similarly, the "main topic" and oval surrounding the text in the image representation of thumbnail 4 (1310) is also larger and more zoomed in in FIG. 13B than that which is shown in FIG. 13A.

In one or more embodiments of the invention, the resized thumbnail (1306, 1310) is associated with a thumbnail region (1314, 1316). The thumbnail region (1314, 1316) is the area or window of the resized thumbnail. Upon expanding thumbnails 2 (1306) and 4 (1310) as shown in FIG. 13B, each expanded thumbnail may be directly annotated in the thumbnail region (1314, 1316). Specifically, in FIG. 13B, thumbnail 2 (1306) is expanded to form the thumbnail 2 region (1314), and annotations (1320) are made directly on top of the expanded image of the circle in thumbnail 2 (1306). In addition, although thumbnail 4 (1310) is also expanded to form the thumbnail 4 region (1316), annotations are not shown as being added to the thumbnail 4 region (1316). Thus, the thumbnail 4 region (1316) includes a larger version of the phrase "main topic" with an oval around the text.

Figure 14:
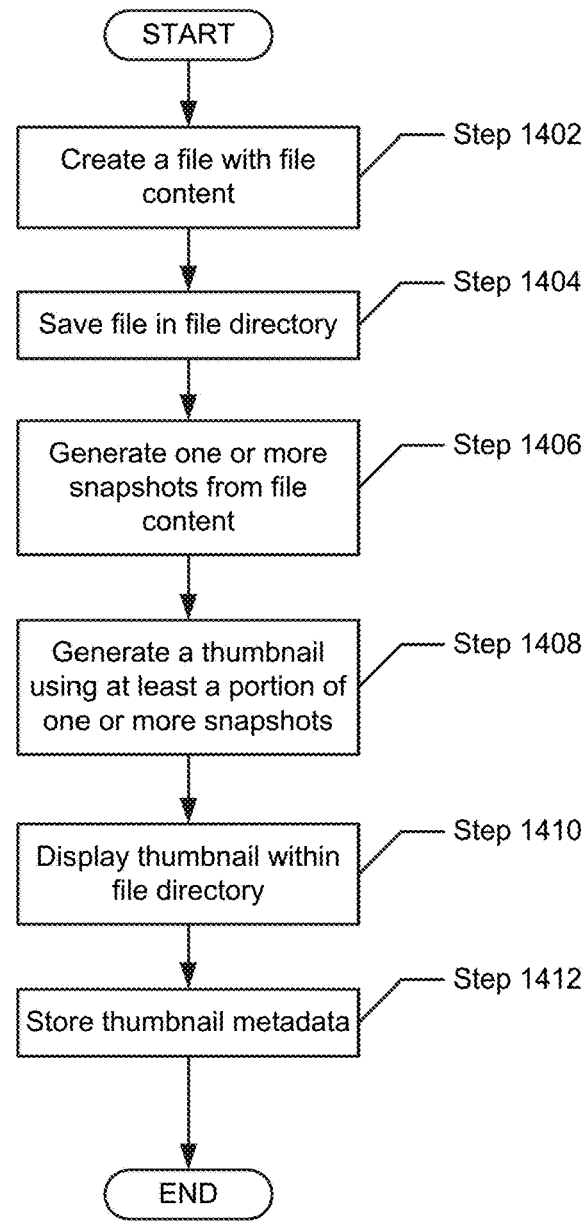
FIG. 14 shows a flow chart for creating a thumbnail in accordance with one or more embodiments of the invention.

FIGS. 14-16 show flow charts for various processes according to one or more embodiments of the invention disclosed herein. While the various steps in each flowchart are presented and described sequentially, one of ordinary skill in the art will appreciate that some or all of the steps may be executed in different orders, may be combined or omitted, and/or may be executed in parallel. In one embodiment of the invention, one or more steps shown in FIGS. 14-16 may be performed in parallel with one or more other steps shown in FIGS. 14-16.

FIG. 14 shows a flow chart for generating a thumbnail in accordance with one or more embodiments of the invention. In Step 1402, a file with file content is created. This may be any type of document with text, drawings, symbols, images, or any other suitable content. In Step 1404, the file is saved in a file directory. The file directory may correspond to a database, file system, or any other type of storage. Next, one or more snapshots are generated from the file content (Step 1406).

Further, a single snapshot for the entire file content may be taken, or multiple snapshots (e.g., one per page of file content) may be taken of the file content. For example, a file may be represented as a virtual canvas, where the file in its entirety, including all of the data in the file, is referred to as a virtual canvas. In one or more embodiments of the invention, a virtual canvas represents content objects that may be selected and/or displayed on interactive devices in a multi-device workspace. Content objects may include text and/or image data. Content objects within the virtual canvas may include portions of a file. For example, content objects may be a portion of text data from the file, or one or more images contained in the file. For example, an e-presentation shown on an e-flipchart apparatus described in FIGS. 1-10 above is a file that may be referred to herein as the virtual canvas. Using the e-presentation example, content objects may be the pages of the e-flipchart presentation.

Continuing with FIG. 14, in Step 1408, a thumbnail is generated using at least a portion of one or more of the snapshots taken in Step 1406. The thumbnail is a scaled-down image of the one or more snapshots used to create the thumbnail.

Thus, the thumbnail may not have the same form factor as the snapshot of the file content, and may not represent all of the information in the file.

In Step 1410, the thumbnail is displayed within the file directory. In Step 1412, any metadata associated with the thumbnail is stored and linked to the thumbnail. In one or more embodiments of the invention, metadata associated with a thumbnail may include viewport information. Viewport information may represent a default display, for example, the first page (P1=first page) of the file content.

In one or more embodiments of the invention, viewport information describes the perspective of the portion of the file content visible to a user and, thus, displayed on a device. In one or more embodiments of the invention, viewport information may include content scaling information (or a zoom factor which is applied to the portion of the file displayed in the thumbnail). For example, viewport information for a particular thumbnail may be a zoom factor of 75%, indicating that the device is viewing the captured portion of the file content, at 75% zoom. As another example, viewport information may include a page ID which identifies a page of the file that is represented in the thumbnail image. Additional and/or alternative information (e.g., window width, window length, orientation, aspect ratio, virtual canvas reference coordinates, etc.) may pertain relevance to viewport information without departing from the invention. Any or all of such information may be included as thumbnail metadata, and stored separately from and linked to, or together with the thumbnail. For example, in one or more embodiments of the invention, thumbnail metadata may be saved as a related file or database asset. Further, in one or more embodiments of the invention, thumbnail metadata may also include maximum scalability information (described below in FIG. 15A).

Those skilled in the art will appreciate that the process of FIG. 14 may be repeated to create one or more thumbnails for each file stored in the database or other repository.

Figure 15A:
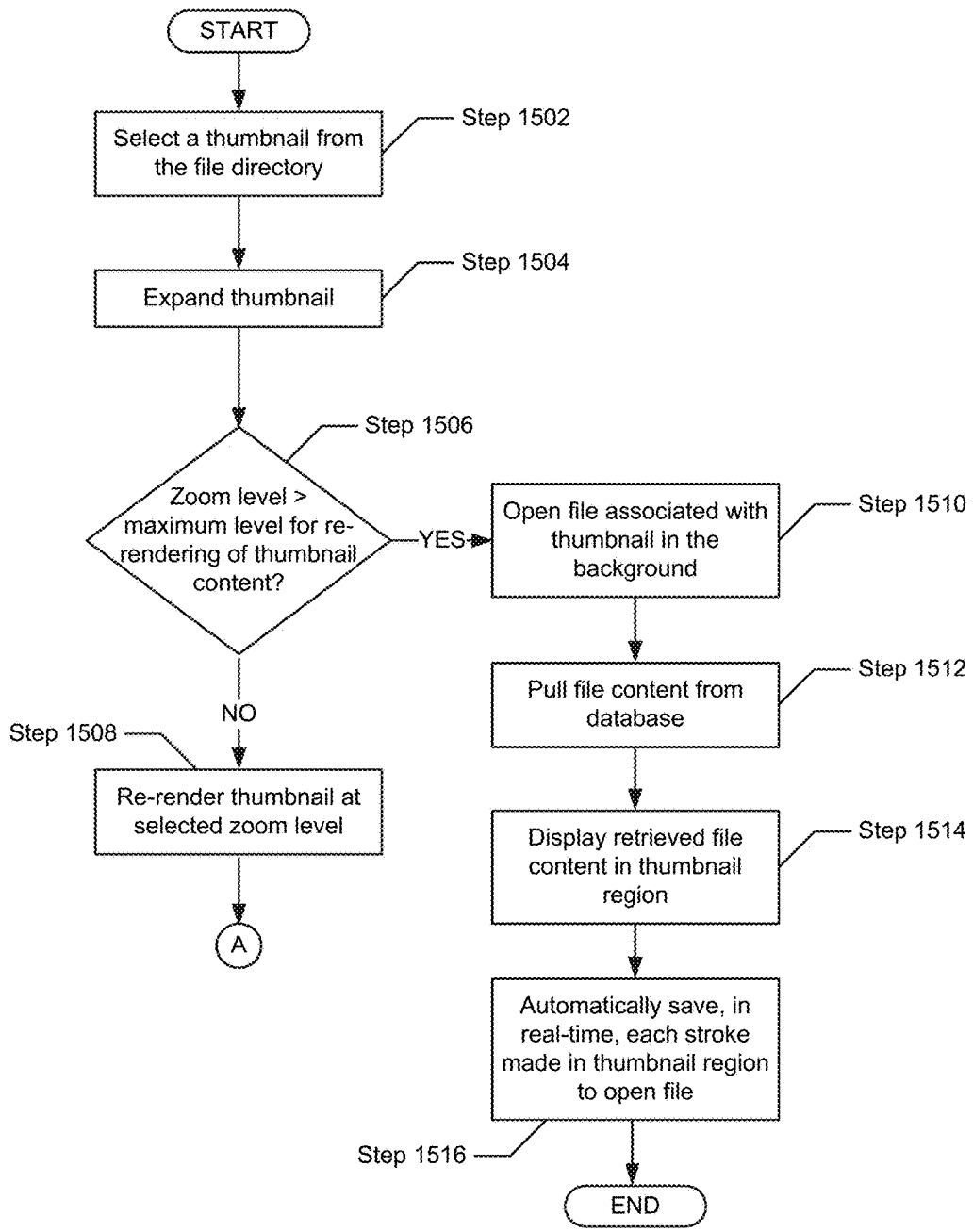
FIGS. 15A, 15B, and 15C show flow charts for annotating a resized thumbnail in accordance with one or more embodiments of the invention.

FIG. 15A shows a flow chart for annotating a thumbnail in accordance with one or more embodiments. In Step 1502, a thumbnail is selected from the file directory. In Step 1504, the thumbnail is optionally expanded. As described above in FIG. 13B, a thumbnail may be expanded, for example, by a gesture action with one or more fingers of a user, or by use of an input device such as a digital marker to expand the corners of the thumbnail. In Step 1506, an optional determination is made as to whether the zoom level or scaling factor for the expanded thumbnail exceeds a maximum level for re-rendering of thumbnail content. Specifically, in one or more embodiments of the invention, because snapshots from which the expanded thumbnail is generated may be stored in local memory (e.g., cache memory) for quick access, a thumbnail may be re-rendered from the cached snapshot(s) up to a certain scaling factor. Within this limit, the thumbnail content is able to be re-rendered from the associated one or more snapshots upon expanding the thumbnail, and the additional information captured to generate the thumbnail may be displayed in the thumbnail region. Beyond this scaling factor or zoom level, the thumbnail content is not cached, and therefore is not readily available for re-rendering of thumbnail content in the thumbnail region. In other words, once an expansion limit for a particular thumbnail is reached, the system is forced to take on the overhead of accessing the original file stored in a database, for example, and pulling down the additional content that should be displayed when the thumbnail region surpasses the maximum scalability factor. For example, when a thumbnail is generated, the thumbnail region may be set to a maximum scalability factor of 10× (i.e., ten times larger than the original thumbnail size). Content may be re-rendered for display in the expanded thumbnail region when the thumbnail is expanded to less than or equal to 10× the original thumbnail size. When a user expands the thumbnail region to be greater than 10× of the original thumbnail size, file content is pulled down from the original file.

With this in mind, turning back to Step 1506, when the zoom level/scaling factor exceeds the maximum level at which re-rendering is permissible, the file associated with the thumbnail is opened in the background (Step 1510). That is, the file that may be stored in a database on a server in the cloud computing environment, for example, is opened seamless to the user. Next, the file content is read from the file or pulled from the database (Step 1512). In one or more embodiments of the invention, although the file and all of its contents is downloaded and available for display, the retrieved file contents are only displayed in the thumbnail region of the expanded thumbnail (Step 1514). As the user annotates the thumbnail in the thumbnail region, each stroke is saved, in real-time, to the open file (Step 1516) in accordance with the discussion above in FIGS. 6-7. The process ends once the user has completed annotating the thumbnail in the thumbnail region.

Those skilled in the art will appreciate that because in the above scenario, all annotations are automatically saved to the open file stroke by stroke, when the thumbnail is reduced to its original size, the static bit image of the thumbnail may include the additional content from the file. Specifically, in one or more embodiments of the invention, one or more new snapshots may be taken during or after the annotations are performed in Step 1516, and these snapshots may be cached locally so that before the thumbnail is reduced to its original size, the process described in FIG. 14 may take place to generate an updated thumbnail which includes the most recent content added to the file directly.

Returning to Step 1506, when the zoom level/scaling factor of the expanded thumbnail is less than or equal to the maximum scaling factor stored as thumbnail metadata, the thumbnail is re-rendered using content from the associated snapshot(s) at the selected zoom level/scaling factor. The process then continues to FIG. 15B.

Figure 15B:
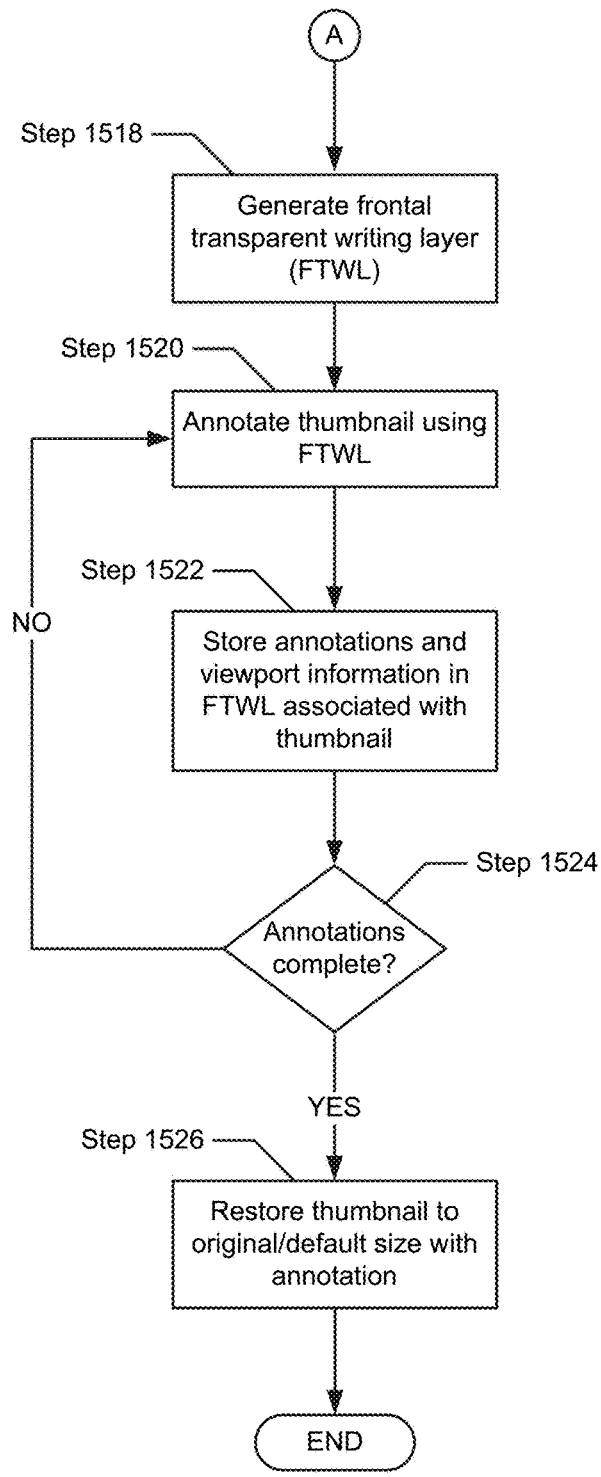

In Step 1518 of FIG. 15B, in response to the expansion of the thumbnail and re-rendering of thumbnail content in the thumbnail region, a frontal transparent writing layer (FTWL) is automatically generated. In one or more embodiments of the invention, the FTWL is generated by the active collaboration system that manages content across multiple interactive devices that may be linked in a multi-device workspace. Next, an input action may be detected in the thumbnail region of the resized/expanded thumbnail in Step 1520. In one or more embodiments of the invention, the input action detected may be an annotation with a user's finger or via a digital marker, a gesture action, or any other suitable input action in the thumbnail region.

Any annotations made in the thumbnail region in Step 1520 are stored in an FTWL file, for example, along with the viewport information (Step 1522). In one or more embodiments of the invention, the generation of the FTWL in Step 1518 is seamless to the user. That is, the user experience in Step 1520 is as if the user is annotating in the thumbnail region directly on the thumbnail. However, in the background, the annotations are captured by the FTWL. In one or more embodiments of the invention, the FTWL may be saved as part of the thumbnail, as part of thumbnail metadata associated with the thumbnail, or as a separate file. Further, in one or more embodiments of the invention, viewport information stored along with the markings made on the thumbnail may specify at what zoom level the annotations were made, one or more coordinates of the virtual canvas where such annotations were made, on which page the annotations were made, a rotation angle at which the annotations were made, etc. Capturing such viewport information allows the system to know the proper form factor to apply to the annotations when they are synchronized to the original file in FIG. 15C.

Those skilled in the art will appreciate that while the above one or more embodiments discuss the generation of the FTWL as being triggered by the expansion of the thumbnail for annotation, the FTWL may be generated at the same time as the thumbnail and may always be present as thumbnail metadata, for example. In addition, in one or more embodiments of the invention, more than one FTWL may exist. For example, when multiple users review the thumbnail outside a collaboration session. Each of these FTWLs may later be reconciled with the file stored in the database, accordance with FIG. 15C.

Continuing with FIG. 15B, as this stage, a determination is made as to whether the annotations directly in the thumbnail region are complete (Step 1524). If the user wishes to continue annotating the thumbnail, the process returns to Step 1520. In one or more embodiments of the invention, every single stroke of annotation made by the user on the FTWL is automatically saved as the strokes are made. In other embodiments of the invention, once the user is done annotating the thumbnail, the set of annotations are captured in the FTWL, and the FTWL is automatically saved. Thereafter, in Step 1526, the thumbnail may be restored to its original/default size and displayed, including all or a portion of the annotations from Steps 1520-1524. In one or more embodiments of the invention, the annotations may be displayed by displaying all or a portion of the FTWL as an overlay on top of the thumbnail image. That is, in one or more embodiments of the invention, the active collaboration system is aware that an FTWL associated with the thumbnail exists, and thus, may display all or a portion of the content in the FTWL superimposed on the thumbnail when the thumbnail is reduced back to a default size.

Those skilled in the art will appreciate that restoring the thumbnail to an original/default size may require normalizing the annotations made in the FTWL to display the annotations proportionally to the resizing of the thumbnail. For example, the zoom level or other viewport information associated with an annotated thumbnail is changed when the thumbnail is reduced in size for display in a file directory. In this case, the proportional changes to the viewport information when the thumbnail is reduced in size may be stored as part of the thumbnail metadata. In another embodiment of the invention, the thumbnail may be restored to a default size by zooming out to the viewport information state stored in the thumbnail metadata. In this case, the viewport information for the annotations made while the thumbnail was expanded may be mirrored to the last zoom state of the thumbnail. That is, the zoom level of the annotations may also be reduced to proportionally match the reduction in size of the thumbnail.

Those skilled in the art will appreciate that in the discussion of FIG. 15B, the file is not opened in the background, because the expansion of the thumbnail by the user was done within the limited zoom level of the corresponding cached snapshots from which the thumbnail was generated. Rather than opening the file and incurring excess overhead, the FTWL is automatically generated, in response to an input action by the user such as expanding the thumbnail or beginning to annotate in the thumbnail region, for example, and the annotations or other input are captured within the FTWL. Further, because the FTWL may be stored as a separate file or as thumbnail metadata, the annotations captured by the FTWL may be synchronized with the actual file at a later point in time, in one or more embodiments of the invention, as discussed below in FIG. 15C.

Figure 15C:
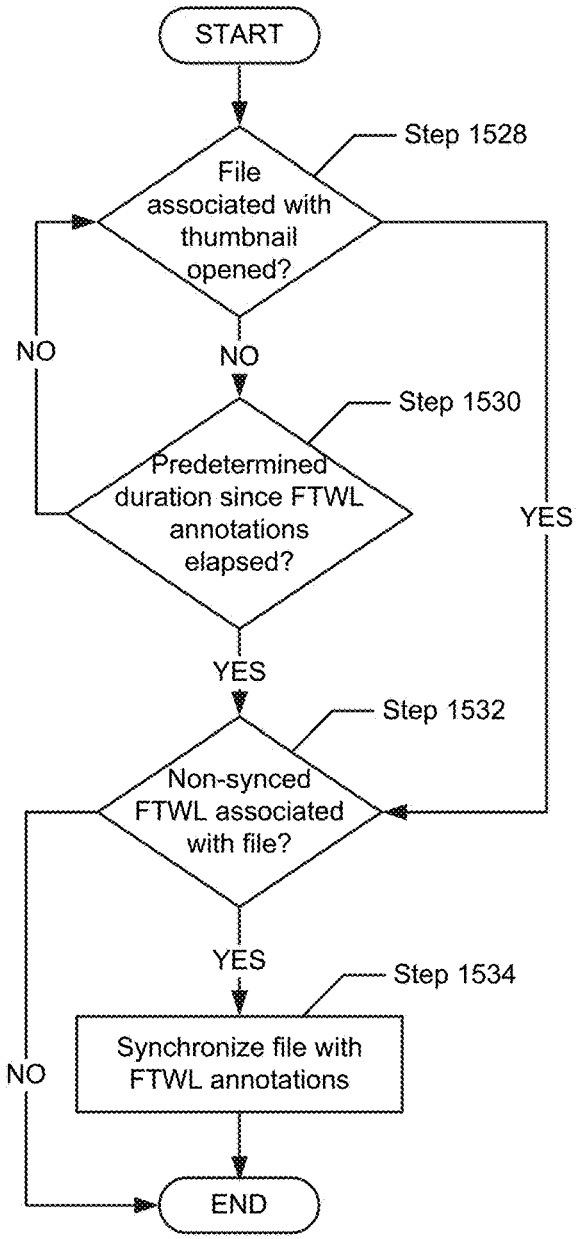

In Step 1528 of FIG. 15C, a determination is made as to whether a file associated with the thumbnail is opened. In one or more embodiments of the invention, when a user or the system opens a file having a thumbnail, the file may be opened directly at the viewport information specific by the thumbnail metadata. That is, when a thumbnail is resized, annotated, and then reduced to its default size, the system may store the viewport information of the annotations made to the thumbnail. Subsequently, when the associated file is opened, the file may also be opened at the place where the annotation was made, and to the zoom level and/or coordinates saved with the annotations. For example, if a circle was drawn on page 4 of the file content in the thumbnail region of a file, at zoom 50%, when the file is later opened, the file may automatically open at page 4 and at 50% zoom. Alternatively, the file may be opened at the beginning of the file content, for example, at page 1.

When a file having a thumbnail representation is opened, a second determination is made as to whether a non-synced FTWL associated with the file is present (Step 1532). More specifically, in one or embodiments of the invention, when a file is opened, the active collaboration framework searches for any FTWL associated with the file that may be stored along with the file, the file thumbnail, or as metadata of the file thumbnail. In one or more embodiments of the invention, even if a FTWL exists, it may have already been synced with the file earlier. This may be determined if, for example, a FTWL associated with a file exists, but is blank. This may mean, in one or more embodiments of the invention, that previous annotations captured in the FTWL have already been synced with the file, and the FTWL was cleared (or deleted) thereafter. Alternatively, a non-synced FTWL may not exist (Step 1532), in which case the process ends.

However, if a non-synced FTWL exists (Step 1532), then the open file is synchronized with the additional content in the FTWL, in Step 1534. That is, the annotations in the FTWL are permanently saved to the file as new file content, and the process ends.

Returning to Step 1528, when a file associated with a thumbnail is not opened, a second determination is made in Step 1530 as to whether a predetermined duration has passed since annotations in a thumbnail region were completed (Step 1524 in FIG. 15B). Specifically, in one or more embodiments of the invention, the active collaboration framework may set a default period of time for which annotations made in a thumbnail region remain in the FTWL or as thumbnail metadata. After this default duration elapses (Step 1530), the active collaboration framework may automatically check for a non-synced FTWL associated with the thumbnail on which annotations were made (Step 1532). If this predetermined duration has not yet elapsed (Step 1530), the process returns to Step 1528. Thus, either when the file is opened or after a predetermined duration has passed, whichever occurs first, the system checks for any associated non-synced FTWLs.

FIG. 16A shows a flow chart for annotating a thumbnail in accordance with one or more embodiments. In Step 1602, a thumbnail is selected in thumbnail view mode, as shown in FIG. 13A, for example. Following this, in Step 1604, an input action, such as an annotation, may be directly made on the selected thumbnail and detected by the interactive device. Specifically, in one or more embodiments of the invention, an annotation may be made on the original, default thumbnail image, without expansion or resizing of the thumbnail. When this occurs, the annotation is saved as a stroke, or stroke input, in a separate file (Step 1606). More specifically, in Step 1606, the active collaboration framework is aware that an annotation on a thumbnail is taking place, and without opening the file stored in the database or file directory, opens a writing on top of thumbnail management utility (WTTMU) in the background. In one or more embodiments of the invention, the WTTMU picks up the stroke input, saves the stroke input in a separate file, and displays the strokes/annotations on top of the thumbnail, as an overlay, without saving them to the file (Step 1608). Further, in one or more embodiments of the invention, the WTTMU may perform the detection of the input action in Step 1602.

In the event that a user navigates inside the thumbnail, e.g., to scroll to another page of the thumbnail when the thumbnail content is more than what is displayed as the static image, the WTTMU follows the viewport information from the thumbnail. In one or more embodiments of the invention, the viewport information is also saved in the WTTMU associated file. In one or more embodiments of the invention, the WTTMU tracks the most recently used viewport information for the thumbnail. In such cases, the next time the thumbnail is displayed, the saved viewport information (i.e., the most recently used viewport information for the thumbnail) is used to display the thumbnail.

As with FIG. 15C, FIG. 16B shows a flow chart for reconciling the WTTMU associated file with the actual file stored in the database on a server in the cloud computing environment, for example. At some later point in time after the user annotates directly on top of the thumbnail and the WTTMU utility captures the strokes, the file associated with the thumbnail may be opened (Step 1610. When this occurs, in one or more embodiments of the invention, the active collaboration system searches for any new WTTMU file related to the opened file. As with the FTWL, the WTTMU file may be saved as a separate file, as file metadata, or as thumbnail metadata. If new stroke input exists for the opened file (Step 1612), then the file content is updated with the new stroke inputs made on top of the thumbnail representation of the file, in Step 1614. If new stroke input does not exist for the opened file, then the process ends.

The following section describes examples in accordance with one or more embodiments of the invention. The examples are not intended to limit the scope of the invention in any way. FIGS. 17A-17G show an example in accordance with one or more embodiments of the invention. In the examples shown, thumbnail resizing is performed to annotate one or more thumbnails in a file directory.

EXAMPLE 1

Figure 17A:
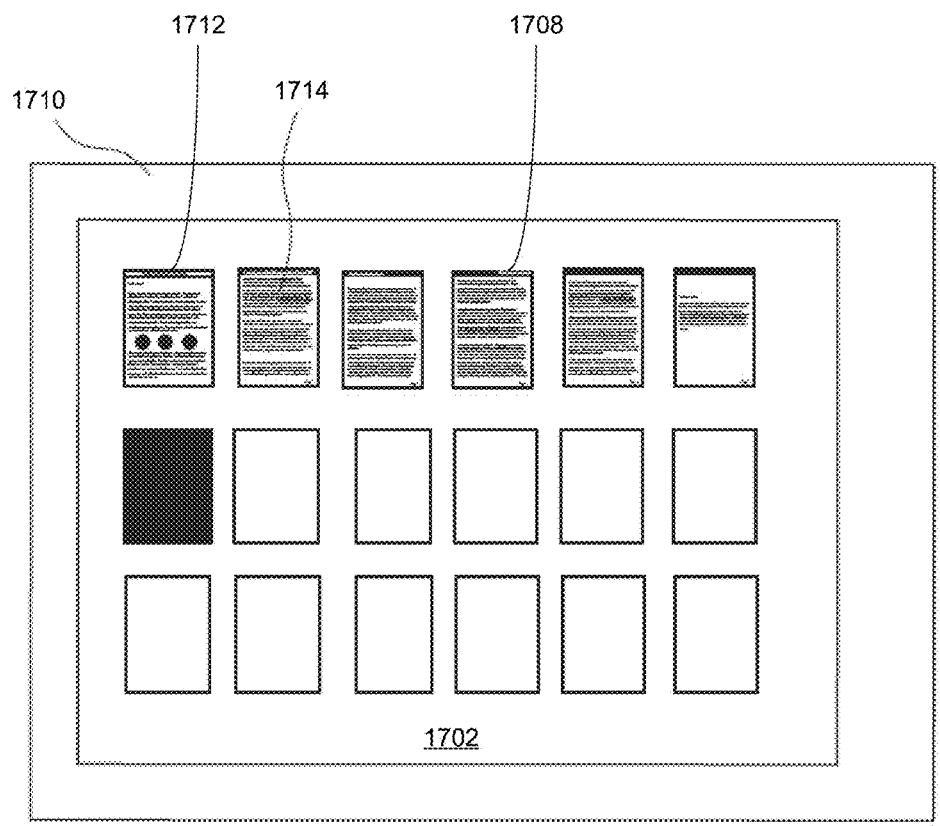
FIGS. 17A through 17G show examples of manipulating resizable thumbnails in accordance with one or more embodiments of the invention.

FIG. 17A shows an interactive device (1710) displaying a file directory (1702) with multiple thumbnails (e.g., thumbnails 1708, 1712, 1714) representing files/documents. As described above, the interactive device (1710) may be any tablet, smartphone, laptop, e-flipchart apparatus, or any other suitable device having a touch sensitive/interactive display screen. Each thumbnail (e.g., 1708, 1712, 1714) is an image generated from at least one or more portions of snapshots taken of the file content at various points in time.

Figure 17B:
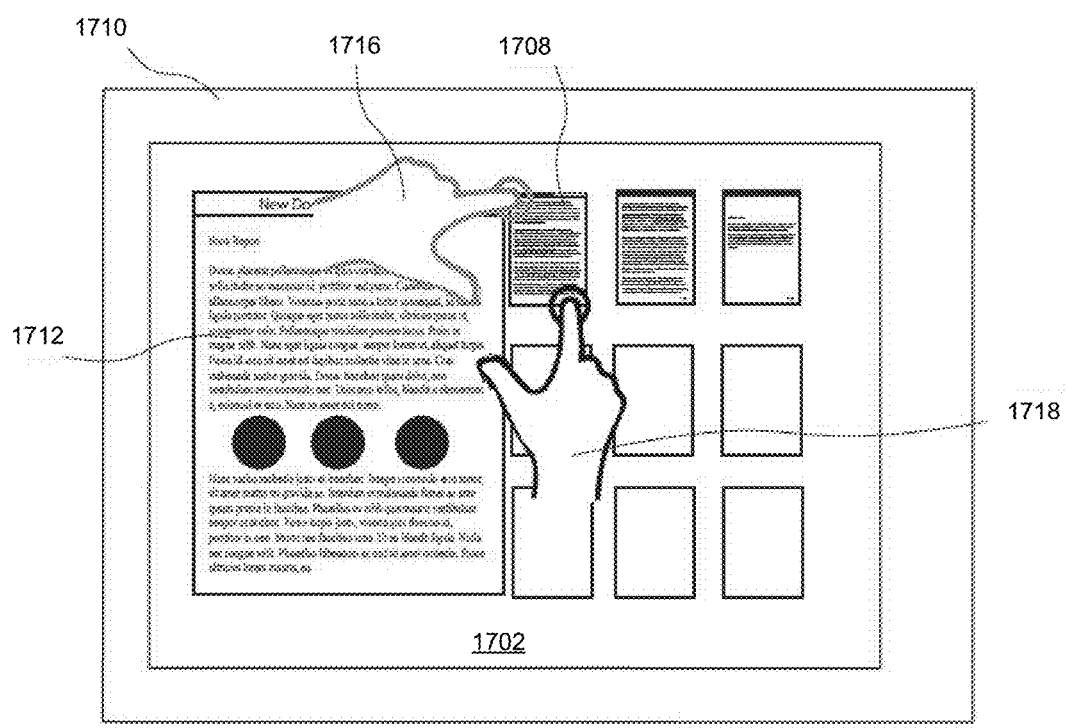

FIG. 17B shows the same interactive device (1710) and file directory view (1702), where a user's fingers (1716, 1718) are resizing thumbnails (1708, 1712). Specifically, in the example of FIG. 17B, a user's fingers (1716, 1718) touch the opposite corner edges of a thumbnail (e.g., 1708, 1712), and with such a gesture, the fingers start to separate, invoke the "expand" or "zoom in" command, making the thumbnail (1712) larger in size. More specifically, thumbnail (1712) is expanded to form a thumbnail region, which is represented by the outer edge of the expanded thumbnail. As shown in FIG. 17B, when the thumbnail (1712) is expanded, the image shown remains the same, but becomes larger. In other words, in one or more embodiments of the invention, the viewport information (specifically zoom %) changes when the thumbnail (1712) is expanded, but the content displayed remains the same. Those skilled in the art will appreciate that when additional snapshot content is cached and readily available, the expanded thumbnail may be re-rendered to show additional content and/or resolution not shown in the image of the smaller thumbnail in thumbnail view mode. In such a scenario, the expanded thumbnail may also be navigated/scrolled to view the re-rendered content, depending on the viewport information for the expanded thumbnail.

Further, in the example of FIG. 17B, the expanded thumbnail (1712) is displayed on top of the other smaller thumbnails, covering for example, thumbnail 1714 from FIG. 17A. In another embodiment of the invention, when thumbnail (1712) is expanded so that the image of the thumbnail overlaps with any of the other thumbnails, the small thumbnails may be pushed aside in a uniform manner In such a scenario, the user continues to be able to view the thumbnail region for the expanded thumbnail, and other thumbnails representing files in the same order as in the thumbnail view mode.

In one or more embodiments of the invention, a user may expand a thumbnail using a user interface menu instead of a gesture action. For example, the user may call a UI menu that shows the size of the thumbnails in a slider form. Using his/her fingers, the user may slide the slider to increase the size of one or more thumbnails. In one or more embodiments of the invention, all of the thumbnails shown in the file directory may expand when the slider UI element is used in the file directory thumbnail view mode.

Figure 17C:
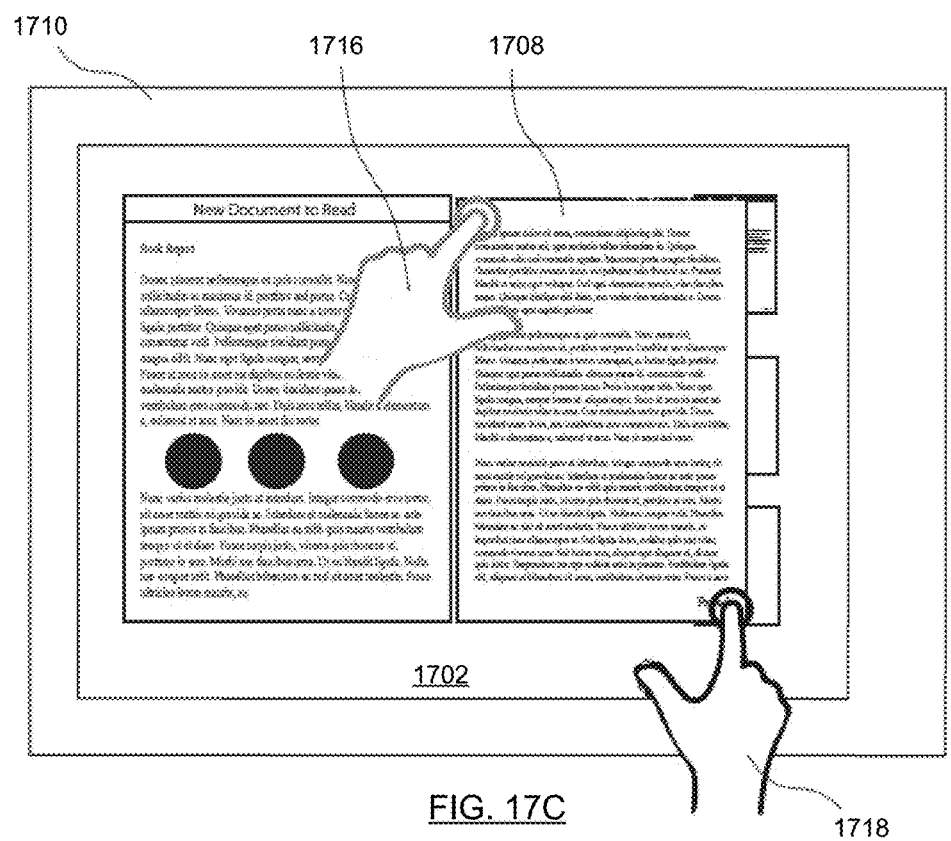

Continuing with Example 1, in FIG. 17C, thumbnail (1712) continues to be shown in expanded form, and in addition, thumbnail (1708) is also expanded to form a larger thumbnail region using the same gesture made with a user's fingers (1716, 1718). In FIG. 17C, the two thumbnails (1708, 1712) are side-by-side in expanded form, and a user may annotate in either thumbnail region of expanded thumbnails (1708, 1712).

Figure 17D:
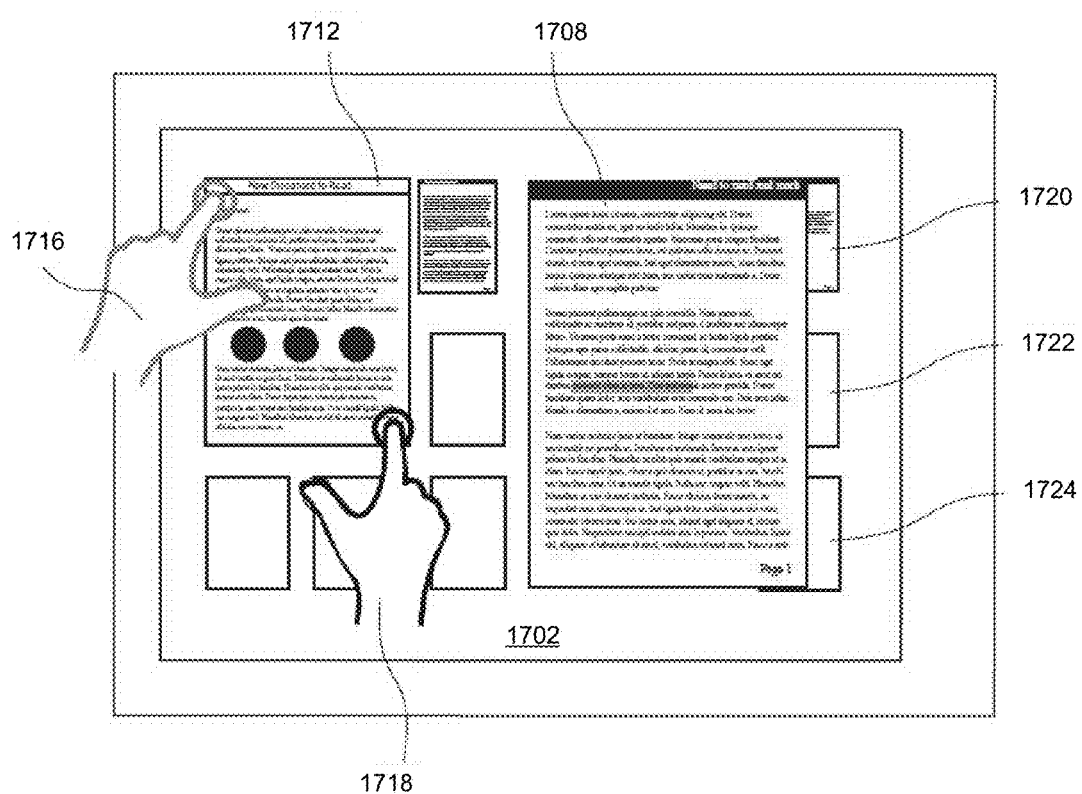

FIG. 17D shows the user's fingers (1716, 1718) starting a contract (or reduce) gesture on the left thumbnail (1712) so that the thumbnail (1712) is smaller than thumbnail (1708), but larger than the other thumbnails (e.g., 1720, 1722, 1724) shown as a default size in the file directory (1702).

Figure 17E:
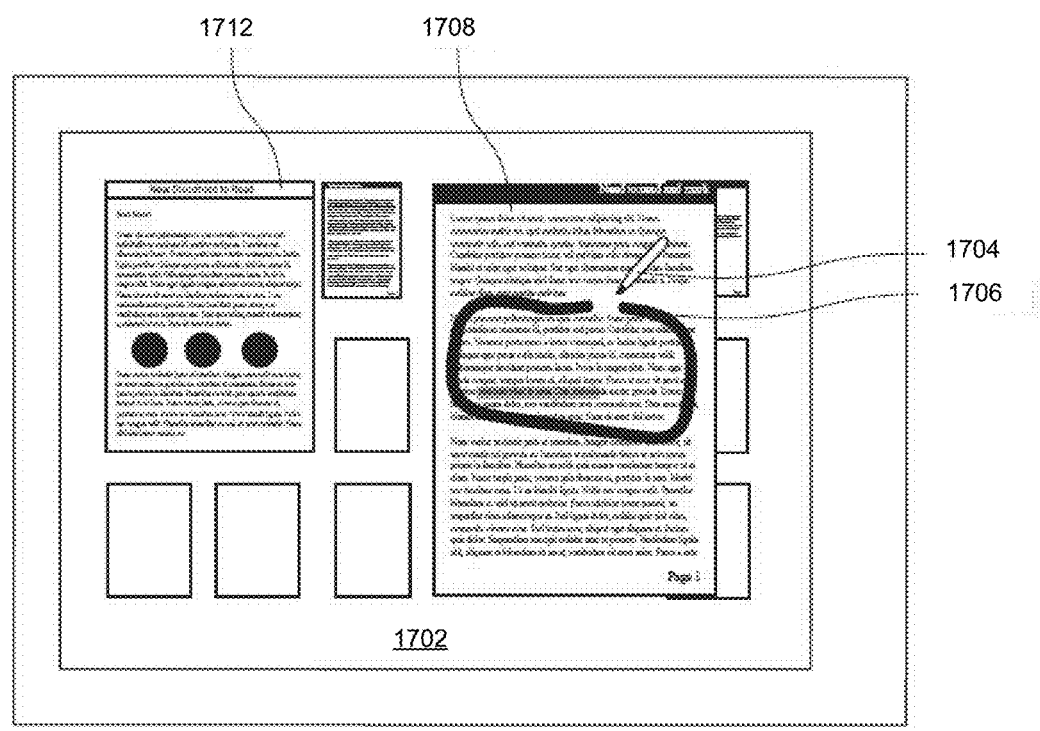

In FIG. 17E, the user performs an input action using a stylus or digital marker (1704) in the thumbnail region of expanded thumbnail (1708). Specifically, the input action is an annotation (1706) consisting of a circle drawn around some text displayed as part of the thumbnail (1708) image. Those skilled in the art will appreciate that the tool (1704) used to create the annotation (1706) may depend on the type of technology used by the interactive device (1710) for marking with virtual ink.

In accordance with FIGS. 15A-15C above, in one or more embodiments of the invention, the expansion of thumbnail (1708) or the annotation (1706) made by the user in FIG. 17E may trigger a FTWL to be generated, in which case the annotation (1706) may be captured by the FTWL and saved separately from the thumbnail/thumbnail metadata, or as part of the thumbnail metadata, and later synchronized with the file when the associated file is opened. Alternatively, in one or more embodiments of the invention, the annotation (1706) may be directly stored to the file, if the file is opened in the background either due to the expansion of the thumbnail exceeding a predetermined threshold (e.g., zoom level or scaling factor) or because the active collaboration framework opens the file in the background for an alternate reason. In either case, for the user making the annotation, one or more strokes are produced without the need to save anything, because the stroke is associated with the thumbnail by the FTWL or automatically saved to the open file.

Figure 17F:
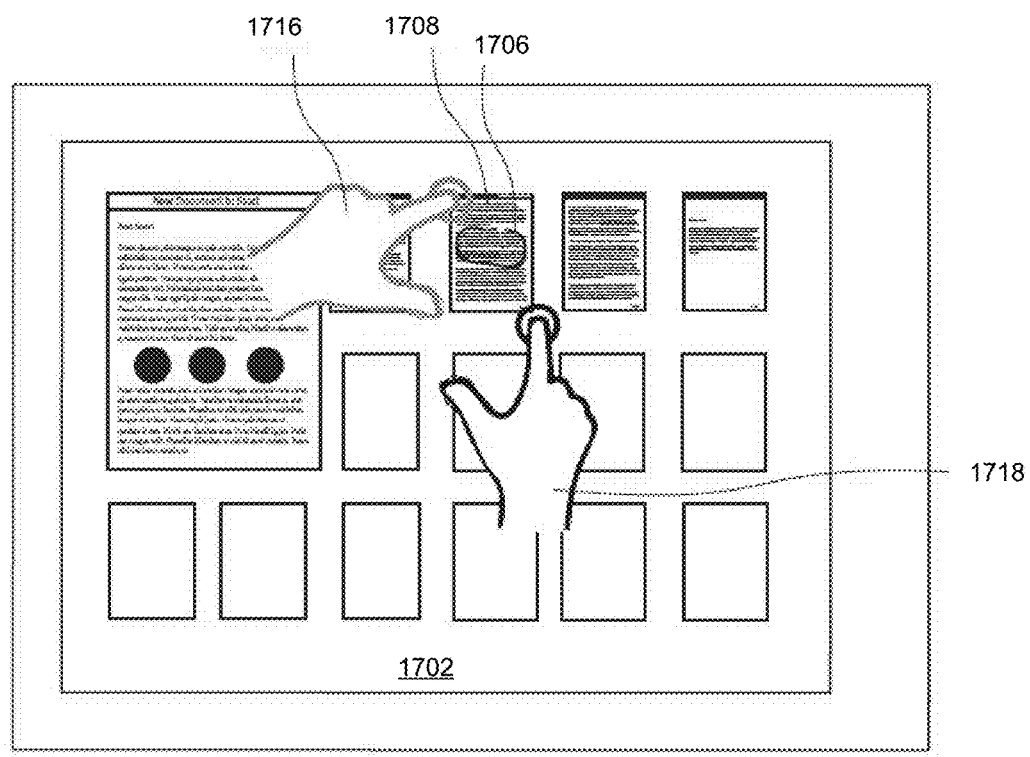

FIG. 17F shows how, in one or more embodiments of the invention, when the user decides to contract the thumbnail (1708) using the user's fingers (1716, 1718), the thumbnail (1708) retains the information drawn with the input tool, in this case the circular stroke (1706) made in FIG. 17E. In one or more embodiments of the invention, the stroke (1706) may be retained in a separate file (an FTWL file) that is shown along with the thumbnail by the active collaboration framework. In addition, the viewport information for the specific zoom level at which the annotation was made may also be stored as part of the separate file, or as part of the thumbnail metadata.

Alternatively, if the associated file is opened in the background when the annotation is made, another snapshot capturing the latest display state of the thumbnail (i.e., including the annotation 1706) may be taken and cached so that the contracted/reduced thumbnail image is updated to reflect the annotation made in FIG. 17E.

Figure 17G:
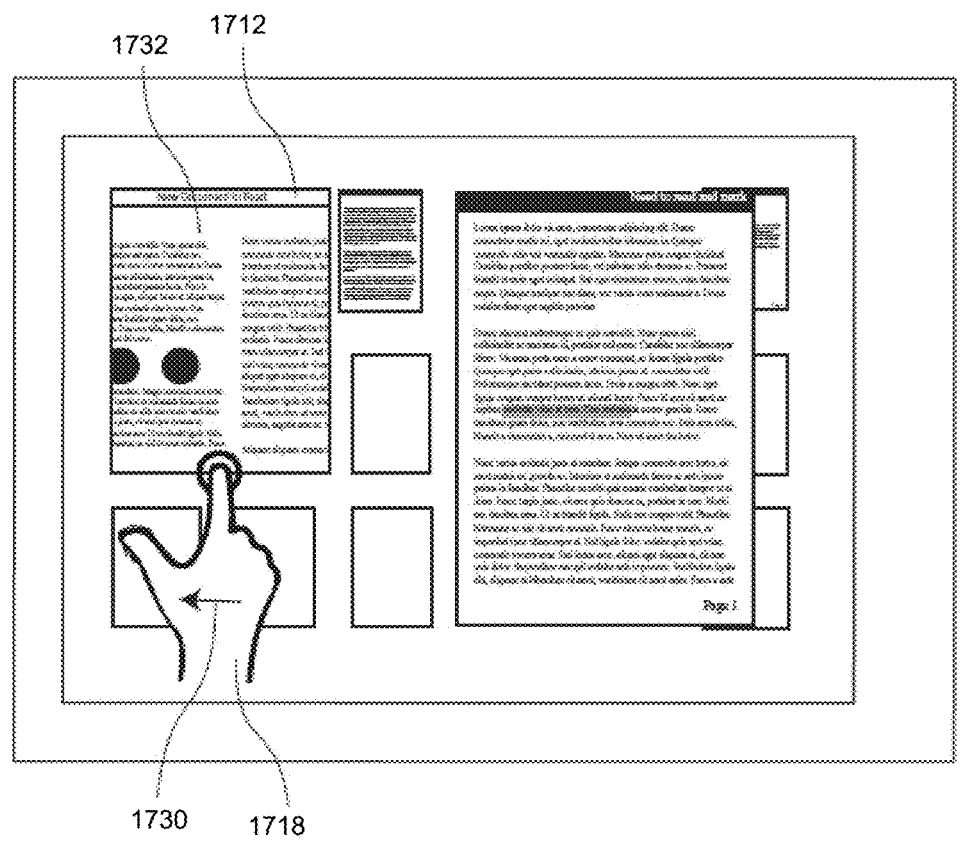

FIG. 17G shows an example of navigating inside a thumbnail region. In one or more embodiments of the invention, a thumbnail of any size may be scrolled without opening the associated file. As described above, the scrolling of a thumbnail is enabled when the thumbnail is generated from one or more snapshots, but not all the content from the snapshots is shown at once in the default thumbnail image. Such navigation may include turning pages or modifying the viewport information in that thumbnail when the snapshot from which the thumbnail is generated includes the entire virtual canvas, for example. FIG. 17F shows for example how a user's finger (1718) moves from right to left (1730) while touching the thumbnail (1712) with the finger (1718) without releasing. In one or more embodiments of the invention, this input action may trigger the scroll/navigate function and the pages of the thumbnail image may slide from page 1 to page 2 (1732), for example. When the user releases the finger, the thumbnail region of expanded thumbnail (1712) shows page number 2. The user may manipulate the thumbnail and make it smaller or bigger, or annotate the thumbnail on page 2. Once the user finishes, all the changes stay permanent till further manipulation of the thumbnail or the file. In this example, the thumbnail (1712) will show page number 2 as the thumbnail image, unless the user navigates back to page 1.

EXAMPLE 2

Consider the scenario in which a system to view shared files is shown as mini thumbnails, where those mini thumbnails may be zoomed in to be the complete page, and when the user who sharing those documents allows, other users may collaborate on top of the thumbnail representing the shared file. When such collaboration is completed, the users viewing the shared files as mini thumbnails may zoom out to reduce the size of the thumbnails of the shared files. However, the mini thumbnails may be static bit images of a different page or in a different state than before such collaboration.

EXAMPLE 3

Consider a scenario in which a teacher is grading on a 32" e-flipchart apparatus. All of the students' papers are located in a folder named "Papers from May $5^{th}$." When the teacher opens the folder, she is able to view all the thumbnails of the students' papers. Now suppose the teacher wants to compare two papers side by side. The teacher may, for example, expand both thumbnails proportionally. Once they are at a zoom level enabling her to clearly see, she may start navigating within those papers and if needed, she could mark them on the spot. Once finished, she has to do nothing Alternatively, the teacher may invoke a UI resizing element and simultaneously resize all of the thumbnails to make them an appropriate size for reading and annotating directly on top of the thumbnail. In yet another embodiment of the invention, the teacher may not expand the thumbnails, but simply check the ones that she has graded, by directly drawing a checkmark on those that she has already looked at. This would be captured by the WTTMS and automatically saved separately until the file is opened.

Using embodiments of the invention, the teacher is able to work directly in the resizeable thumbnail, without having to open the file documents. The annotations or markings she makes on each student's paper are automatically saved and synchronized with the file the next time the file is opened.

Figure 18:
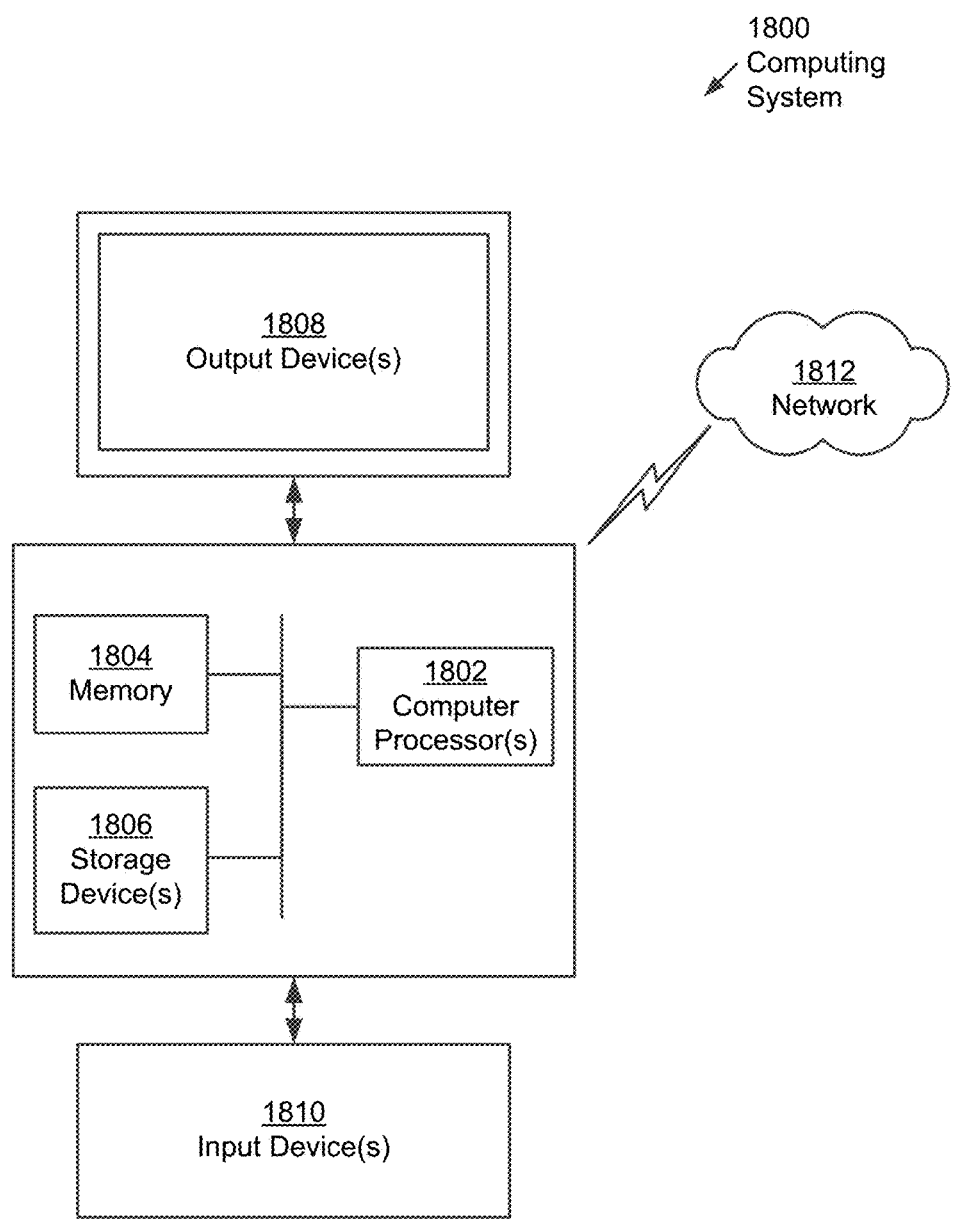
FIG. 18 shows a computer system in accordance with one or more embodiments of the invention.

Embodiments described herein may be implemented on a computing system. Any combination of mobile, desktop, server, embedded, or other types of hardware may be used. For example, as shown in FIG. 18, the computing system (1800) may include one or more computer processor(s) (1802), associated memory (1804) (e.g., random access memory (RAM), cache memory, flash memory, etc.), one or more storage device(s) (1806) (e.g., a hard disk, an optical drive such as a compact disk (CD) drive or digital versatile disk (DVD) drive, a flash memory stick, etc.), and numerous other elements and functionalities. The computer processor(s) (1802) may be an integrated circuit for processing instructions. For example, the computer processor(s) may be one or more cores, or micro-cores of a processor. The computing system (1800) may also include one or more input device(s) (1810), such as a touchscreen, keyboard, mouse, microphone, touchpad, electronic pen, or any other type of input device. Further, the computing system (1800) may include one or more output device(s) (1808), such as a screen (e.g., a liquid crystal display (LCD), a plasma display, touchscreen, cathode ray tube (CRT) monitor, reflective display, projector, or other display device), a printer, external storage, or any other output device. One or more of the output device(s) may be the same or different from the input device(s). The computing system (1800) may be connected to a network (1812) (e.g., a local area network (LAN), a wide area network (WAN) such as the Internet, mobile network, or any other type of network) via a network interface connection (not shown). The input and output device(s) may be locally or remotely (e.g., via the network (1812)) connected to the computer processor(s) (1802), memory (1804), and storage device(s) (1806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1800) may be located at a remote location and connected to the other elements over a network (1812). Further, embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments of the invention, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method for editing thumbnails, the method comprising:
   detecting an input action to resize a thumbnail associated with a file, wherein the thumbnail is a static image of at least a portion of a snapshot of file content in the file, and the thumbnail is displayed in a file directory on an interactive device;
   in response to the detecting, obtaining an expanded thumbnail;
   making a first determination that viewport information of the expanded thumbnail does not exceed a first predetermined threshold;
   generating, in response to the input action, a frontal transparent writing layer (FTWL) operatively linked with the expanded thumbnail;
   capturing, in the FTWL, an annotation made in a thumbnail region of the expanded thumbnail; and
   storing the annotation and viewport information for the annotation in the FTWL.

2. The non-transitory computer readable medium of claim 1, wherein the method further comprises:
   restoring the expanded thumbnail to an original size to obtain a reduced thumbnail, wherein the reduced thumbnail is displayed with at least a portion of the annotation in the FTWL.

3. The non-transitory computer readable medium of claim 2, wherein restoring the expanded thumbnail to the original size comprises normalizing the annotation made in the expanded thumbnail for display in the reduced thumbnail.

4. The non-transitory computer readable medium of claim 1, wherein the interactive device is one selected from the group consisting of: a tablet, a smartphone, an e-flipchart apparatus, an interactive board, and a laptop.

5. The non-transitory computer readable medium of claim 1, wherein detecting the input action to expand the thumbnail comprises detecting a gesture action.

6. The non-transitory computer readable medium of claim 1, wherein the snapshot is cached locally on the interactive device.

7. The non-transitory computer readable medium of claim 6, wherein the expanded thumbnail comprises additional content from the snapshot that is not displayed in the thumbnail prior to expansion of the thumbnail.

8. The non-transitory computer readable medium of claim 1, the method further comprising:
   detecting a second input action to resize a second thumbnail associated with a second file, wherein the thumbnail is a second static image of at least a portion of snapshot of file content in the second file, and the second thumbnail is displayed in the file directory on the interactive device;
   in response to the detecting, obtaining a second expanded thumbnail;
   making a second determination that viewport information of the second expanded thumbnail exceeds a second predetermined threshold;
   opening the second file associated with the second thumbnail;
   downloading file content from the second file;
   displaying the file content from the second file in a thumbnail region of the second expanded thumbnail; and
   capturing stroke input, in real-time, and automatically saving the stroke input directly to the second file.

9. The non-transitory computer readable medium of claim 8, the method further comprising:
   taking a second snapshot of the file content of the second file, wherein the second snapshot captures the stroke input;
   generating an updated thumbnail using the second snapshot of the file content of the second file, wherein the updated thumbnail comprises an image of at least a portion of the second snapshot of the file content of the second file; and
   displaying the second thumbnail as representing the second file in the file directory.

10. The non-transitory computer readable medium of claim 1, wherein the FTWL is stored as one selected from the group consisting of: a separate file operatively linked to the thumbnail and thumbnail metadata associated with the thumbnail.

11. The non-transitory computer readable medium of claim 1, wherein the viewport information comprises one selected from a group consisting of a maximum scaling factor and a threshold zoom level for the expanded thumbnail, and wherein the viewport information is stored as thumbnail metadata associated with the thumbnail.

12. The non-transitory computer readable medium of claim 1, wherein the viewport information comprises one selected from the group consisting of a zoom level at which the annotation was made, coordinates of a virtual canvas at which the annotation was made, a rotation angle of the annotation, and a page ID that identifies a page of the file content on which the annotation was made.

13. The non-transitory computer readable medium of claim 1, the method further comprising:
   after storing the annotation and viewport information in the FTWL, receiving a request to open the file associated with the thumbnail;
   determining that the FTWL is not synchronized with the file; and
   synchronizing the file with the FTWL by saving the annotation and the viewport information into the file.

14. The non-transitory computer readable medium of claim 13, the method further comprising:
   one selected from a group consisting of: clearing the FTWL, after synchronizing the file with the FTWL and deleting the FTWL, after synchronizing the file with the FTWL.

15. A non-transitory computer readable medium comprising instructions, which when executed by a processor perform a method for editing thumbnails, the method comprising:
   detecting an input action on a thumbnail associated with a file, the input action comprising an annotation directly on the thumbnail, wherein the thumbnail is an image of at least a portion of a snapshot of file content in the file, and the thumbnail is displayed in a file directory on an interactive device;
   saving the annotation as a stroke input in a writing on top of thumbnails management utility (WTTMU) file; and
   displaying the annotation as an overlay on top of the thumbnail in the file directory.

16. The non-transitory computer readable medium of claim 15, the method further comprising:
   after saving the annotation as stroke input in the WTTMU, receiving a request to open the file associated with the thumbnail;
   determining whether a new stroke input exists in the WTTMU file; and
   updating the file with the new stroke input from the WTTMU file, when the new stroke input exists.

17. The non-transitory computer readable medium of claim 15, wherein the interactive device is one selected from the group consisting of: a tablet, a smartphone, an e-flipchart apparatus, and a laptop.

18. The non-transitory computer readable medium of claim 15, wherein the WTTMU file is stored as one selected from the group consisting of: thumbnail metadata associated with the thumbnail and a separate file operatively linked to the thumbnail.

19. The non-transitory computer readable medium of claim 15, wherein the detecting is performed by the WTTMU.

20. The non-transitory computer readable medium of claim 15, wherein the WTTMU tracks viewport information of the thumbnail and wherein the viewport information is used to display the thumbnail when it is subsequently opened.

21. The non-transitory computer readable medium of claim 15, wherein the input action is performed on the thumbnail.

22. The non-transitory computer readable medium of claim 15, wherein the annotation comprises a stroke input.

* * * * *

UNITED STATES PATENT AND TRADEMARK OFFICE
CERTIFICATE OF CORRECTION

PATENT NO. : 10,430,924 B2  
APPLICATION NO. : 15/639671  
DATED : October 1, 2019  
INVENTOR(S) : Alfonso Fabian de la Fuente, Michael Howatt Mabey and Nashirali Samanani Page 1 of 1

It is certified that error appears in the above-identified patent and that said Letters Patent is hereby corrected as shown below:

In the Claims

Column 29, Line 59, in Claim 8, the phrase "portion of snapshot" should read -- portion of a snapshop --.

Signed and Sealed this  
Tenth Day of December, 2019

Andrei Iancu  
*Director of the United States Patent and Trademark Office*